(12) United States Patent
Bouchard et al.

(10) Patent No.: US 10,831,840 B2
(45) Date of Patent: Nov. 10, 2020

(54) METHODS AND SYSTEMS FOR HANDLING ONLINE REQUESTS BASED ON INFORMATION KNOWN TO A SERVICE PROVIDER

(71) Applicant: BCE INC., Verdun (CA)

(72) Inventors: Jean Bouchard, Sillery (CA); Stephane Maxime Francois Fortier, Breakeyville (CA); Sean MacLean Murray, Ottawa (CA)

(73) Assignee: BCE Inc., Verdun (CA)

( * ) Notice: Subject to any disclaimer, the term of this patent is extended or adjusted under 35 U.S.C. 154(b) by 0 days.

(21) Appl. No.: 14/488,699

(22) Filed: Sep. 17, 2014

(65) Prior Publication Data

US 2015/0006561 A1  Jan. 1, 2015

Related U.S. Application Data

(63) Continuation of application No. 12/226,880, filed as application No. PCT/CA2007/001865 on Aug. 14, 2007, now abandoned.

(Continued)

(51) Int. Cl.
*G06F 16/00* (2019.01)
*G06F 16/9535* (2019.01)
(Continued)

(52) U.S. Cl.
CPC ......... *G06F 16/9535* (2019.01); *G06F 16/24* (2019.01); *G06Q 20/02* (2013.01); *G06Q 20/10* (2013.01); *G06Q 20/40* (2013.01); *G06Q 30/0251* (2013.01); *G06Q 30/0253* (2013.01); *G06Q 30/0254* (2013.01); *G06Q 30/0255* (2013.01); *G06Q 30/0264* (2013.01); *G06Q 30/0269* (2013.01); *G06Q 30/0277* (2013.01); *G06Q 40/00* (2013.01); *G06Q 40/12* (2013.12); *H04L 63/0892* (2013.01); *H04L 67/02* (2013.01); *H04L 67/10* (2013.01); *H04L 67/306* (2013.01); *H04W 4/023* (2013.01)

(58) Field of Classification Search
CPC .......... G06F 17/30; G06F 17/00; G06F 16/00
See application file for complete search history.

(56) References Cited

U.S. PATENT DOCUMENTS

| 6,347,307 B1* | 2/2002 | Sandhu | G06Q 40/00 705/36 R |
| 6,487,538 B1* | 11/2002 | Gupta | G06Q 30/02 705/14.66 |

(Continued)

FOREIGN PATENT DOCUMENTS

WO  WO 0186546 A1 *  11/2001  ............. G06Q 30/06

*Primary Examiner* — Farhan M Syed

(57) ABSTRACT

Methods and systems for handling online requests based on information known to a service provider. One method may comprise: obtaining first information, the first information relating to an online request made using a communication apparatus; using a logical identifier assigned to the communication apparatus to obtain second information, the second information pertaining to a profile associated with the logical identifier; comparing the first information to the second information; and performing an action related to handling of the online request based on a result of the comparing.

31 Claims, 9 Drawing Sheets

Related U.S. Application Data

(60) Provisional application No. 60/941,830, filed on Jun. 4, 2007.

(51) Int. Cl.

| | | |
|---|---|---|
| *H04W 4/02* | (2018.01) | |
| *H04L 29/08* | (2006.01) | |
| *G06Q 30/02* | (2012.01) | |
| *G06Q 40/00* | (2012.01) | |
| *G06F 16/24* | (2019.01) | |
| *G06Q 20/02* | (2012.01) | |
| *G06Q 20/10* | (2012.01) | |
| *G06Q 20/40* | (2012.01) | |
| *H04L 29/06* | (2006.01) | |

(56) References Cited

U.S. PATENT DOCUMENTS

| | | | |
|---|---|---|---|
| 6,760,746 B1* | 7/2004 | Schneider | H04L 67/10 709/203 |
| 7,004,382 B2* | 2/2006 | Sandru | G06Q 20/042 235/375 |
| 7,107,285 B2* | 9/2006 | von Kaenel | G06Q 40/08 |
| 7,290,278 B2* | 10/2007 | Cahill | G06Q 20/0855 705/64 |
| 7,516,882 B2* | 4/2009 | Cucinotta | G06Q 20/042 235/379 |
| 8,073,837 B2* | 12/2011 | Yao | G06Q 30/0257 707/713 |
| 8,321,278 B2* | 11/2012 | Haveliwala | G06F 16/9535 705/14.66 |
| 8,396,811 B1* | 3/2013 | Hahn-Carlson | G06Q 30/02 705/64 |
| 8,566,237 B2* | 10/2013 | Forzley | G06Q 20/00 345/156 |
| 8,645,426 B2* | 2/2014 | Yao | G06Q 30/0257 707/791 |
| 8,838,553 B2* | 9/2014 | von Kaenel | G06Q 40/08 707/694 |
| 8,838,555 B2* | 9/2014 | Von Kaenel | G06Q 40/08 707/694 |
| 8,898,196 B2* | 11/2014 | Yao | G06Q 30/0257 707/791 |
| 8,918,730 B2* | 12/2014 | von Kaenel | G06Q 40/08 715/764 |
| 8,983,896 B2* | 3/2015 | von Kaenel | G06Q 40/08 707/602 |
| 2004/0117358 A1* | 6/2004 | von Kaenel | G06Q 40/08 |
| 2005/0076248 A1* | 4/2005 | Cahill | G06Q 20/0855 726/19 |
| 2005/0186948 A1* | 8/2005 | Gallagher | H04W 16/16 455/414.1 |
| 2007/0050340 A1* | 3/2007 | von Kaenel | G06F 21/604 |
| 2007/0210148 A1* | 9/2007 | Cucinotta | G06Q 20/042 235/379 |
| 2007/0276721 A1* | 11/2007 | Jackson | G06Q 30/02 705/14.51 |
| 2008/0114657 A1* | 5/2008 | Forzley | G06Q 20/00 705/14.23 |
| 2008/0222085 A1* | 9/2008 | Bostick | H04L 29/12122 |
| 2008/0307339 A1* | 12/2008 | Boro | G06F 7/06 715/764 |
| 2009/0089254 A1* | 4/2009 | Von Kaenel | G06Q 40/08 |
| 2010/0030867 A1* | 2/2010 | Yao | G06Q 30/0277 709/215 |
| 2010/0114941 A1* | 5/2010 | Von Kaenel | G06F 16/29 707/769 |
| 2011/0004830 A1* | 1/2011 | Von Kaenel | G06F 16/29 715/751 |
| 2011/0219035 A1* | 9/2011 | Korsunsky | G06F 21/00 707/784 |
| 2011/0225511 A1* | 9/2011 | Xu | G06F 7/00 715/753 |
| 2011/0270833 A1* | 11/2011 | von Kaenel | G06F 16/29 707/736 |
| 2012/0059728 A1* | 3/2012 | Yao | G06Q 30/0601 705/14.73 |
| 2014/0149209 A1* | 5/2014 | Yao | H04L 67/1097 705/14.49 |

* cited by examiner

METHODS AND SYSTEMS FOR HANDLING ONLINE REQUESTS BASED ON INFORMATION KNOWN TO A SERVICE PROVIDER

CROSS-REFERENCE TO RELATED APPLICATIONS

The present application is a continuation of, and claims the priority benefit from, U.S. patent application Ser. No. 12/226,880 filed on Apr. 29, 2010, which is a 371 of International Application PCT/CA2007/001865 filed on Aug. 14, 2007, which claims the benefit under 35 USC 119(e) of U.S. Provisional Patent Application No. 60/941,830 filed on Jun. 4, 2007.

The aforementioned applications are hereby incorporated by reference herein.

FIELD OF THE INVENTION

The present invention relates generally to online requests effected over computer networks such as the Internet and, more particularly, to methods and systems for handling online requests based on information known to a service provider.

BACKGROUND

Computer networks such as the Internet allow users to make various online requests. For example, a user can make a request for an online transaction (e.g., a request to purchase a product or service offered on a network site, a request to transfer funds to or from a financial account, etc.); a request for a delivery of a product or service to a particular place (e.g., a request to have food delivered to a house or other building); a request for an access to online private content (e.g., a request to access an online email account); a request for a download of data (e.g., a request to download a video file, an audio file, a software upgrade file, streaming video, streaming audio, etc.); etc.

In order to handle an online request made by a user, a network element (e.g., a server) processes information related to the online request and provided by the user. For example, where a user makes a request to purchase a product or service offered on a network site using a credit card, a server operated by a card issuing bank that issued the credit card typically processes credit card information (e.g., a card number, an expiry date, and/or a cardholder's name) provided by the user in order to approve or deny the online transaction attempted to be made by the user; where a user makes a request to have a given product or service delivered to a house or other building, a server operated by an entity responsible to effect this delivery typically processes a civic address of the house or other building provided by the user in order to determine where to deliver the product or service; where a user makes a request to access an online email account, a server operated by an entity providing the online email account typically processes a user name and password provided by the user in order to identify and control access to the online email account; etc.

Handling of an online request made by a user often involves verifying whether information related to the online request and provided by the user has been legitimately used by the user and/or can be trusted. For example, where a user makes a request to purchase a product or service offered on a network site and provides credit card information for this purpose, a verification as to whether the user is legitimately providing the credit card information is typically made in an effort to counter fraudulent online transactions; where a user makes a request to have a given product or service delivered to a house or other building and provides a civic address for this purpose, a verification as to whether the civic address is valid may be made in an effort to avoid delivery to a wrong or invalid address; etc.

While there are techniques for verifying whether information related to an online request and provided by a user making the online request has been legitimately used by the user and/or can be trusted, these techniques are sometimes inconvenient, cumbersome, and/or ineffective. In particular, existing techniques may be ineffective in situations where the information provided by the user is incorrect, out of date, or susceptible to fraud.

Accordingly, there remains a need for improvement in verifying whether information related to an online request and provided by a user making the online request has been legitimately used by the user and/or can be trusted.

SUMMARY OF THE INVENTION

As embodied and broadly described herein, the present invention provides a method comprising: obtaining first information, the first information relating to an online request made using a communication apparatus; using a logical identifier assigned to the communication apparatus to obtain second information, the second information pertaining to a profile associated with the logical identifier; comparing the first information to the second information; and performing an action related to handling of the online request based on a result of the comparing.

The present invention also provides an apparatus comprising an interface for receiving messages and a processing unit coupled to the interface. The processing unit is responsive to receipt of a message at the interface for: obtaining first information, the first information relating to an online request made using a communication apparatus; using a logical identifier assigned to the communication apparatus to obtain second information, the second information pertaining to a profile associated with the logical identifier; comparing the first information to the second information; and performing an action related to handling of the online request based on a result of the comparing.

The present invention also provides a computer-readable medium storing a program element for execution by a computer. The program element comprises: first program code for causing the computer to obtain first information, the first information relating to an online request made using a communication apparatus; second program code for causing the computer to use a logical identifier assigned to the communication apparatus to obtain second information, the second information pertaining to a profile associated with the logical identifier; third program code for causing the computer to perform a comparison of the first information to the second information; and fourth program code for causing the computer to perform an action related to handling of the online request based on a result of the comparison.

The present invention also provides a method comprising: receiving a first message conveying a logical identifier; consulting a database on a basis of the logical identifier to obtain information known to a service provider involved in assigning the logical identifier; processing the information to generate a second message to be used in handling an online request made using a communication apparatus to which is assigned the logical identifier; and transmitting the second message.

The present invention also provides an apparatus comprising an interface for receiving a first message conveying a logical identifier and a processing unit coupled to the interface. The processing unit is operative for: consulting a database on a basis of the logical identifier to obtain information known to a service provider involved in assigning the logical identifier; processing the information to generate a second message to be used in handling an online request made using a communication apparatus to which is assigned the logical identifier; and causing said interface to transmit the second message.

The present invention also provides a computer-readable medium storing a program element for execution by a computer. The program element comprises: first program code for causing the computer to receive a first message conveying a logical identifier; second program code for causing the computer to consult a database on a basis of the logical identifier to obtain information known to a service provider involved in assigning the logical identifier; third program code for causing the computer to process the information to generate a second message to be used in handling an online request made using a communication apparatus to which is assigned the logical identifier; and fourth program code for causing the computer to transmit the second message.

These and other aspects of the invention will become apparent to those of ordinary skill in the art upon review of the following description of embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which.

It is to be expressly understood that the description and drawings are only for purposes of illustration of example embodiments of the present invention and are an aid for understanding. They are not intended to be a definition of the limits of the invention.

DETAILED DESCRIPTION OF EMBODIMENTS

Figure 1:
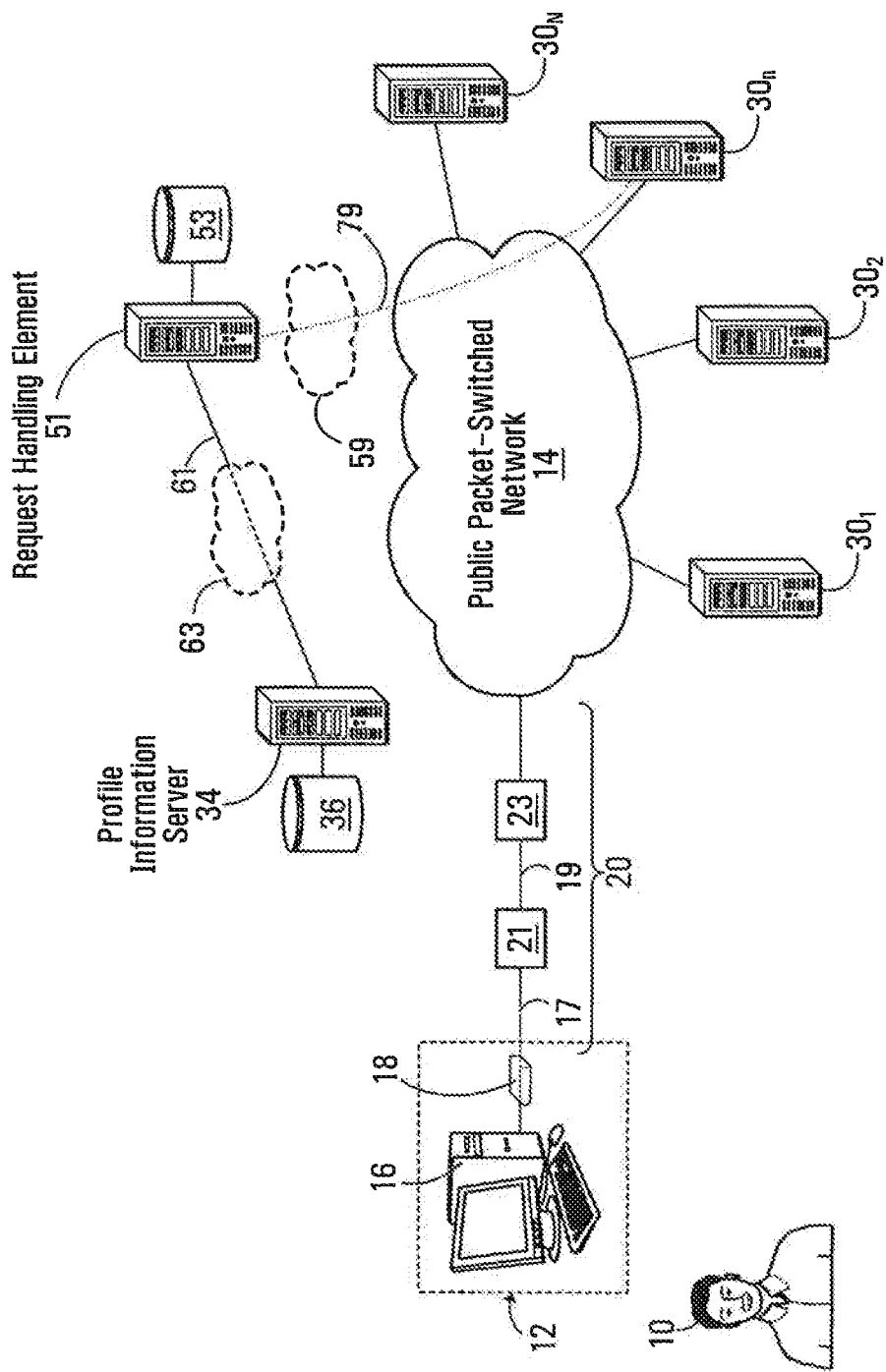
FIG. 1 shows an architecture allowing a user of a communication apparatus connected to a public packet-switched network to access and interact with network sites of that network, for example, to make online requests, in accordance with an embodiment of the present invention.

FIG. 1 depicts an architecture allowing a user 10 of a communication apparatus 12 connected to a public packet-switched network 14 (e.g., the Internet) to access and interact with network sites (e.g., web sites) of the network 14, in accordance with an embodiment of the present invention.

In this embodiment, the communication apparatus 12 comprises a computing device 16 and a network interface unit 18. For example, the computing device 16 may be implemented as a personal computer (PC) such as a desktop computer, a laptop computer, or a tablet PC. The computing device 16 is provided with at least one input device such as a keyboard, a mouse, a touchscreen, a stylus, a microphone, etc., as well as a display and possibly one or more other output devices (e.g., speakers) that enable interaction between the user 10 and the computing device 16. The computing device 16 is operative to run a software application implementing a network browser (e.g., a web browser) with which the user 10 can interact via the display (and possibly one or more other output devices) and the at least one input device in order to access and interact with network sites of the public packet-switched network 14.

The network interface unit 18 enables the communication apparatus 12 to exchange data with the public packet-switched network 14 via a communication link 20. For example, in various embodiments, and depending on the nature of the communication link 20, the network interface unit 18 may be implemented as a modem such as a broadband modem (e.g., a digital subscriber line (DSL) modem or a cable model or a narrowband modem (e.g., a dial-up modem). Although it is shown as being a separate component in FIG. 1, the network interface unit 18 may be integrated into the computing device 16 (e.g., it may be a card internal to the computing device 16).

The communication link 20 may traverse one or more network elements and comprise one or more physical links and one or more logical links. For example, the communication link 20 may comprise a physical link 17 between the network interface unit 18 and a network element 21. The physical link 17 may comprise a copper twisted pair, a coax cable, an Ethernet link, a fiber optic link (e.g., fiber to the premises (FTTP)), a fixed wireless link, a satellite link, or a combination thereof. Depending on the nature of the physical link 17, the network element 21 may be a DSL access multiplexer (DSLAM), a cable modem termination system (CMTS), or another type of network element. The communication link 20 may also comprise a dedicated logical link 19 between the network element 21 and another network element 23 that provides access to the public packet-switched network 14. For instance, the network element 23 may be a network access server (NAS), a router, etc. It will be appreciated that the communication link 20 may take on many forms in various embodiments.

While in this embodiment the communication apparatus 12 comprises the computing device 16 and the network interface unit 18, it will be appreciated that the communication apparatus 12 may comprise other components in other embodiments.

In order to exchange data with the public packet-switched network 14, the communication apparatus 12 is assigned a logical identifier. The logical identifier, which may be assigned to the computing device 16 or the network interface unit 18, may be an Internet Protocol (IP) address (e.g., in compliance with IPv4 or IPv6) or a proprietary address, label or tag. The logical identifier may be statically assigned to the communication apparatus 12 in which case it does not change over time (e.g., a static IP address). Alternatively, the logical identifier may be dynamically assigned to the communication apparatus 12 in which case it may change over time (e.g., a dynamic IP address).

The logical identifier may be assigned to the communication apparatus 12 by a network element that is part of the communication link 20 (e.g., the network element 23 in embodiments where it is a network access server). This network element may assign the logical identifier to the communication apparatus 12 when the communication apparatus 12 is activated (e.g., when the network interface unit 18 and/or the computing device 16 is/are powered-up) or otherwise regains network connectivity and/or at certain time intervals which may range from an hour or less to several months or more. For instance, in embodiments where the logical identifier is a dynamic IP address, the network element assigning the dynamic IP address to the communication apparatus 12 may do so in accordance with the Dynamic Host Configuration Protocol (DHCP) using a pool of IP addresses accessible to that network element. It will be recognized that assignment of the logical identifier to the communication apparatus 12 may be effected in various ways in various embodiments.

As mentioned previously, the user 10 can use the communication apparatus 12 to access and interact with network sites of the public packet-switched network 14. These network sites are implemented by servers $30_1 \ldots 30_N$ connected to the public packet-switched network 14. The servers $30_1 \ldots 30_N$ and the network sites that they implement are operated, managed or otherwise associated with various entities, including, for example, companies, governmental organizations, non-profit organizations, and individuals.

Each of the servers $30_1 \ldots 30_N$ comprises suitable hardware, firmware, software, control logic, or a combination thereof for implementing a plurality of functional components, including an interface and a processing unit. The interface of each of the servers $30_1 \ldots 30_N$ is adapted to receive and send data (e.g., in the form of messages) from and to communication apparatus (such as the communication apparatus 12) connected to the public packet-switched network 14 as well as other elements (e.g., computers or databases) communicatively coupled to that server but not necessarily connected to the packet-switched network 14. The processing unit of each of the servers $30_1 \ldots 30_N$ is adapted to effect various processing operations to implement that server's functionality.

Interaction of the user 10 with a network site implemented by a server $30_n$ ($1 \leq n \leq N$) typically involves the network browser implemented by the computing device 16 interacting with the server $30_n$ in order to allow the user 10 to view, hear or otherwise be exposed to content (e.g., web pages) of the network site via the display and/or one or more other output devices of the computing device 16, and possibly to input information (e.g., by entering text, selecting an option, etc.) and/or one or more commands (e.g., by clicking on a graphical button or a hyperlink) via the at least one input device of the computing device 16.

Occasionally, during his/her interaction with the network site implemented by the server $30_n$, the user 10 may use the communication apparatus 12 to make an online request. The online request can be any request made online, i.e., any request made by way of the communication apparatus 12 transmitting data over the public packet-switched network 14. The online request can be a request for anything which can be requested online. For example, in various embodiments, the online request may be:

a request for an online transaction (e.g., a request to purchase a product or service offered on the network site implemented by the server $30_n$; a request to pay a bill for a previously obtained product or service via the network site; a request to transfer funds to or from an account, such as a bank account or an online wallet account, via the network site; a request to buy or sell securities (e.g., stocks, bonds, etc.) via the network site; a request to make a donation to a charity or other institution through the network site; etc.);

a request for a delivery of a product or service to a particular place (e.g., a request to deliver food to a house or other building, a request to send a cab to a house or other building, etc.);

a request for an access to online private content (e.g., a request to access an online email account (e.g., a Hotmail® or Gmail® account), an online subscriber account (e.g., a telephone service subscriber account, a television service subscriber account), or any other online content intended to be accessible only to a particular person or group);

a request for an access to a private network (e.g., a request to access an enterprise's private work from a location outside the enterprise's premises, etc.); or a request for a download of data (e.g., a request to download a video file, an audio file, a software upgrade file, streaming video, audio or other media, or any other data downloadable via the network site implemented by the server $30_n$).

These examples are presented for illustrative purposes only and should not be considered limiting in any way since, as mentioned above, the online request can be a request for anything which can be requested online.

In making the online request while interacting with the network site implemented by the server $30_n$, the user 10 provides via the communication apparatus 12 information related to the online request. This information, which is hereinafter referred to as "request-related information", can take on various forms depending on the nature of the online request being made. For example:

In embodiments where the online request is a request for an online transaction, the request-related information may be information regarding a transaction object. A "transaction object" refers to any physical or virtual object designed to be used in an attempt to make a transaction. For example, a transaction object may be a payment card (e.g., a credit card, a debit card, etc.), a financial account (e.g., a bank account, an online wallet account, etc.), an electronic check, a set of one or more digital cash (electronic money) certificates, or any other physical or virtual object designed to be used in an attempt to make a transaction. The information regarding the transaction object is hereinafter referred to as "transaction object information" and can take on various forms depending on the nature of the online transaction to be made and the nature of the transaction object itself. In various possible examples, the transaction object information may be:

payment card information regarding a payment card in situations where, for instance, the user 10 desires to purchase a product or service offered on the network site implemented by the server $30_n$, pay a bill for a previously obtained product or service via the network site, or make a donation to a charity or other institution through the network site, using the payment card. Such payment card information may be, for instance, credit card information regarding a credit card (e.g., a card number, an expiry date, and/or a cardholder's name) or debit card information regarding a debit card (e.g., a card number and/or a cardholder's name);

electronic check information regarding an electronic check (e.g., a check number and/or a checking account number) in situations where, for instance, the user 10 desires to effect a payment via the network site implemented by the server $30_n$ using the electronic cheek;

digital cash information regarding a set of one or more digital cash certificates (e.g., digital cash certificate identifiers) in situations where, for instance, the user 10 desires to effect a payment via the network site implemented by the server $30_n$ using the set of one or more digital cash certificates; or financial account information regarding a financial account (e.g., an account number and/or a holder's name) in situations where, for instance, the user 10 desires to effect a transfer of funds to or from the financial account via the network site implemented by the server $30_n$.

These examples are presented for illustrative purposes only since, as mentioned above, the transaction object information provided by the user 10 via the communication apparatus 12 can take on many different forms depending on the nature of the online transaction to be made and the nature of the transaction object itself.

In embodiments where the online request is a request for a delivery of a product or service to a particular place, the request-related information may be a location where the product or service is to be delivered. For instance, the location may be expressed as a civic address of a house or other building.

In embodiments where the online request is a request for an access to online private content, the request-related information may be identification and authentication information used to identify and authenticate the user 10 in order to allow him/her to access the online private content. For instance, the identification and authentication information may include a user name and a password.

In embodiments where the online request is a request for an access to a private network, the request-related information may be identification and authentication information used to identify and authenticate the user 10 in order to allow him/her to access the private network. For instance, the identification and authentication information may include a user name and a password.

In embodiments where the online request is a request for a download of data, the request-related information may be a bandwidth believed by the user 10 to be available to download the data. For instance, the bandwidth may be specified by the user 10 selecting, from a plurality of options corresponding to different connection speeds (e.g., 56, 256 or 1048 kbps) presented on the network site implemented by the server $30_n$, the option corresponding to the connection speed that the user 10 believes is available to download data to the communication apparatus 12.

It will be appreciated that these examples are presented for illustrative purposes only since, as mentioned above, the request-related information can take on many different forms depending on the nature of the online request being made.

The request-related information may be provided by the user 10 via the communication apparatus 12 in various ways. For example, the user 10 may use the at least one input device of the computing device 16 to input the request-related information and cause this information to be sent by the communication apparatus 12 to the server $30_n$ (or another computer associated with the server $30_n$) over the public packet-switched network 14. Alternatively, the request-related information may have been previously stored in a memory of the computing device 16, in which case the user 10 may use the at least one input device of the computing device 16 to cause the communication apparatus 12 to send the request-related information to the server $30_n$ (or another computer associated with the server $30_n$) over the public packet-switched network 14.

Continuing with FIG. 1, there is provided a request handling element 51 adapted to process the request-related information provided by the user 10 via the communication apparatus 12 in order to handle the online request made by the user 10. Functionality of the request handling element 51 depends on the nature of the online request being made. For example:

In embodiments where the online request is a request for an online transaction, the request handling element 51 may be a transaction validation server adapted to validate the online transaction requested to be made. In such embodiments, the transaction validation server is operated, managed or otherwise associated with an entity responsible for validating the online transaction requested to be made using the transaction object information provided by the user 10 via the communication apparatus 12. For instance, this entity may be a bank or other financial institution that provides the transaction object to the user 10 (e.g., a card issuing bank in cases where the transaction object is a credit card or a debit card).

In embodiments where the online request is a request for a delivery of a product or service to a particular place, the request handling element 51 may be adapted to verify the location of the particular place and arrange for the product or service to be delivered to the particular place.

In embodiments where the online request is a request for an access to online private content, the request handling element 51 may be adapted to provide the online private content and control access thereto.

In embodiments where the online request is a request for an access to a private network, the request handling element 51 may be adapted to control access to the private network.

In embodiments where the online request is a request for a download of data, the request handling element 51 may be adapted to provide the data and allow it to be downloaded.

Depending on the nature of the online request, in some embodiments, the request handling element 51 may be communicatively coupled to the server $30_n$ via a communication path 79. The communication path 79 may be established over the public packet-switched network 14 and/or another network 59 (e.g., a financial network). For example, this may be the case where the online request is a request for an online transaction and the request handling element 51 is a transaction validation server remote from the server $30_n$. In such embodiments, the request handling element 51 comprises suitable hardware, firmware, software, control logic, or a combination thereof for implementing a plurality of functional components, including an interface and a processing unit. The interface of the request handling element 51 is adapted to receive and send data (e.g., in the form of messages) from and to servers, other computers and/or other elements (e.g., databases). The processing unit of the request handing element 51 is adapted to effect various processing operations to implement that element's functionality. In other embodiments, the request handling element 51 may be part of the server 30$_n$. For example, this may be the case where the online request is a request for an access to online private content that is provided by the server 30$_n$, a request for a download of data that is provided by the server 30$_n$, or a request for a delivery of a product or service offered on the network site implemented by the server 30$_n$.

As shown in FIG. 1, in some embodiments, the request handling element 51 may have access to a database 53. More particularly, depending on the nature of the online request made by the user 10, upon processing the request-related information provided by the user 10 via the communication apparatus 12, the request handling element 51 may determine that this information matches information included in a record (not shown) that is contained in the database 53. In such cases, the record is associated with a party (who may or may not be the user 10) having a relationship with the entity operating, managing or otherwise associated with the request handling element 51. For example, the record may be a profile or other account associated with the party. The record may include personal information regarding the party. For instance, this personal information may include a name, a gender, a date of birth or an age, a nationality, a correspondence language, a civic address (e.g., a residential or work address), a phone number (e.g., a residential, work, Voice-over-Internet Protocol (VoIP), or mobile phone number), an email address, and/or an instant messaging (IM) identifier of the party. Other personal information regarding the party may be included in the record. Also, in some cases, the party may be more than one person, in which cases the record may include personal information regarding each such person. The personal information regarding the party may be included in the record as a result of interaction between the party and the entity operating, managing or otherwise associated with the request handling element 51 (e.g., during a registration phase where the record is created).

Specific contents of the database 53 will depend on the nature of the online request made by the user 10 and the functionality of the request handling element 51. A specific example of potential contents of the database 53 will be considered later on.

For now, suffice it to say that, in some embodiments, upon processing the request-related information provided by the user 10 via the communication apparatus 12, the request handling element 51 may use the personal information included in the record that is contained in the database 53 and that includes information matching the request-related information, in order to handle the online request made by the user 10. In these embodiments, by virtue of being used to handle the online request, the personal information included in the record that is contained in the database 53 can also be viewed as information related to the online request.

In some embodiments, the request handling element 51 and the database 53 may be part of separate network elements and communicatively coupled to one another via a communication link, which may traverse one or more network elements and comprise one or more physical links and one or more logical links. In other embodiments, the request handling element 51 and the database 53 may be part of a common network element. In yet other embodiments, the database 53 may be distributed amongst a plurality of network elements and/or physical locations.

With continued reference to FIG. 1, in accordance with an embodiment of the present invention, there is provided a network element 34, hereinafter referred to as a "profile information server", which can interact with the request handling element 51 as part of a process to handle the online request made by the user 10 using the communication apparatus 12. As further discussed below, the profile information server 34 allows information pertaining to a profile that is associated with the logical identifier assigned to the communication apparatus 12 to be used in order to handle the online request made by the user 10 using the communication apparatus 12.

Interaction between the profile information server 34 and the request handling element 51 takes place over a communication link 61. The communication link 61 may be established over a network 63, which may comprise part of the public packet-switched network 14, a financial network and/or another network, and may traverse one or more network elements and comprise one or more physical links and one or more logical links. For example, the communication link 61 may be a dedicated and secure link established between the profile information server 34 and the request handling element 51. It will be recognized that the communication link 61 may be implemented in various manners in different embodiments.

The profile information server 34 has access to a profile information database 36. In some embodiments, the profile information server 34 and the profile information database 36 may be part of separate network elements and communicatively coupled to one another via a communication link, which may traverse one or more network elements and comprise one or more physical links and one or more logical links. In other embodiments, the profile information server 34 and the profile information database 36 may be part of a common network element. In yet other embodiments, the profile information database 36 may be distributed amongst a plurality of network elements and/or physical locations.

Figure 2:
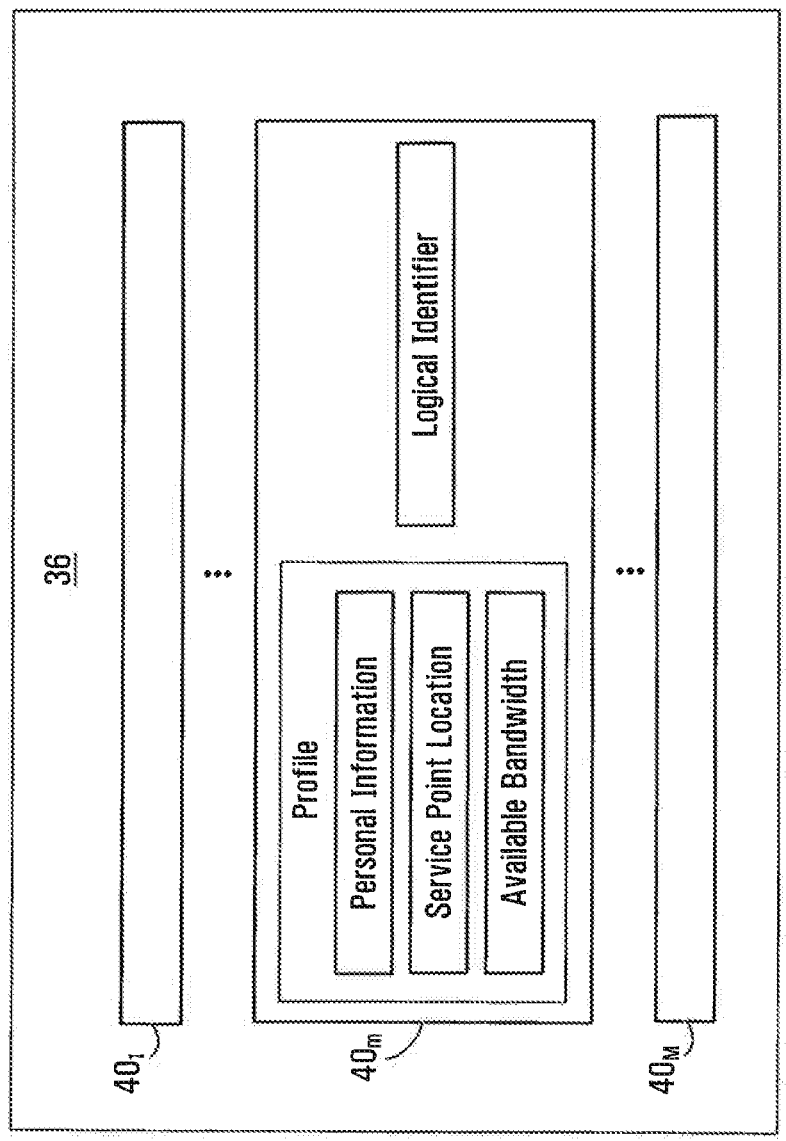
FIG. 2 shows an example of potential contents of a profile information database accessible to a profile information server of the architecture shown in FIG. 1.

Referring additionally to FIG. 2, there is shown an example of potential contents of the profile information database 36. In this example, the profile information database 36 stores a plurality of records 40$_1$ . . . 40$_M$. Each of the records 40$_1$ . . . 40$_M$ associates a profile to a logical identifier assigned to a communication apparatus (such as the logical identifier assigned to the communication apparatus 12).

The profile in a record 40$_m$ (1≤m≤M) includes information known to a service provider involved in assigning the logical identifier that is associated with that profile. The service provider may be an access service provider (ASP, also sometimes called a regional access network provider (RANP)) that may or may not be an internet service provider (ISP). For example, the information in the record 40$_m$ may include:

personal information regarding a party to which the service provider provides a network access service. For instance, this personal information may include a name, a gender, a date of birth or an age, a nationality, a correspondence language, a civic address (e.g., a residential or work address), a phone number (e.g., a residential, work, VoIP or mobile phone number), an email address, an IM identifier, and/or financial information (e.g., credit or debit card information, bank account information, or other information used to pay for the network access service) of the party. Other personal information regarding the party may be included in the record. Also, in some cases, the party may be more than one person, in which cases the record 40$_m$ may include personal information regarding each such person. The personal information regarding the party may be included in the record 40$_m$ as a result of interaction between the party and the service provider (e.g., during a registration or service activation phase where the record $40_m$ is created); and/or a location of a service point where the communication apparatus to which is assigned the logical identifier in the record $40_m$ is located. The "service point" refers to a physical point where the service provider provides a network access service to an end-user (such as the user 10) of the communication apparatus to which is assigned the logical identifier in the record $40_m$. For example, the service point may be a house or other building (or an area thereof). The location of the service point, which is hereinafter referred to as the "service point location", may be expressed as a civic address (e.g., a service address), a set of geo-coordinates, or any other information identifying where the service point is located; and/or a bandwidth available to the communication apparatus to which is assigned the logical identifier in the record $40_m$.

This example of information content of a profile is presented for illustrative purposes only and should not be considered limiting in any respect. Generally, a profile that is associated with a given logical identifier assigned to a communication apparatus can include any information known to a service provider involved in assigning the given logical identifier to the communication apparatus.

An example process by which the profile information database 36 may be populated is described later on. For now, suffice it to say that the profile information database 36 stores the records $40_1 \ldots 40_M$ that associate profiles to logical identifiers.

The profile information server 34 is operative to use information included in the profile information database 36 as part of its interaction with the request handling element 51 in order to handle the online request made by the user 10 using the communication apparatus 12. To that end, the profile information server 34 comprises suitable hardware, firmware, software, control logic, or a combination thereof for implementing a plurality of functional components, including an interface and a processing unit. The interface of the profile information server 34 is adapted to receive and send data (e.g., in the form of messages) from and to the request handling element 51, and possibly other servers, computers and/or other elements (e.g., databases) communicatively coupled to the profile information server 34 via communication links (not shown) that may be established over the public packet-switched network 14 and/or another network and that may traverse one or more network elements and comprise one or more physical links and one or more logical links. The processing unit of the profile information server 34 is adapted to effect various processing operations to implement that server's functionality.

Operation of the profile information server 34, its interaction with the request handling element 51, as well as operation of other network elements, will now be illustrated in the context of an example where the online request made by the user 10 using the communication apparatus 10 is a request for an online transaction. More particularly, in this example, it is assumed that the user 10, while interacting with the network site implemented by the server $30_n$, makes a request to purchase a product or service offered on the network site using a particular credit card.

Figure 3A:
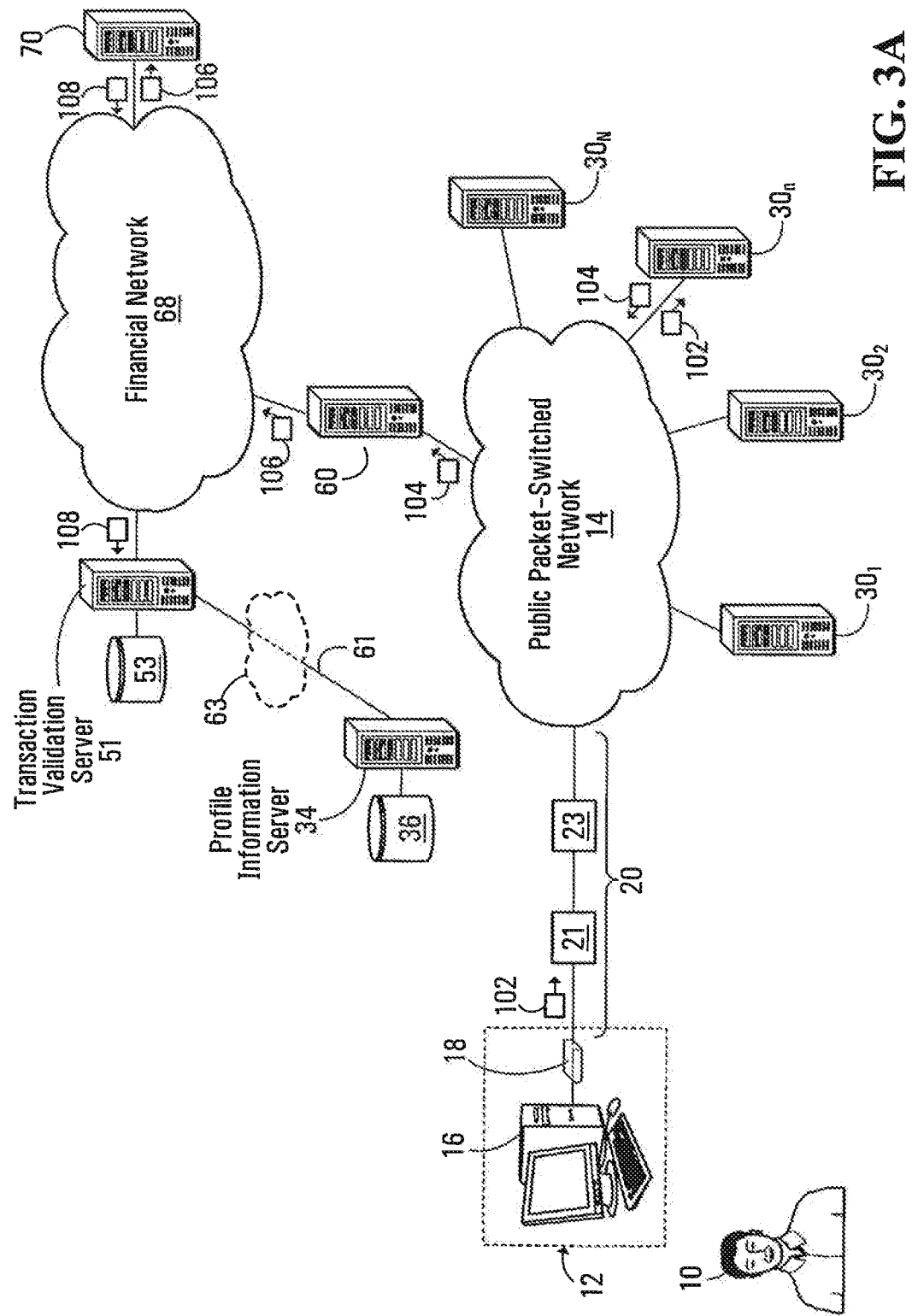
FIGS. 3A and 3B illustrate an example of interaction between the profile information server, a transaction validation server and other elements of the architecture shown in FIG. 1, in an example scenario where the user of the communication apparatus makes a request for an online transaction using a credit card.

Accordingly, for purposes of this example, and with reference to FIG. 3A, the request handling element 51 is a transaction validation server associated with a card issuing bank, i.e., a financial institution that issued the particular credit card used by the user 10.

Figure 4:
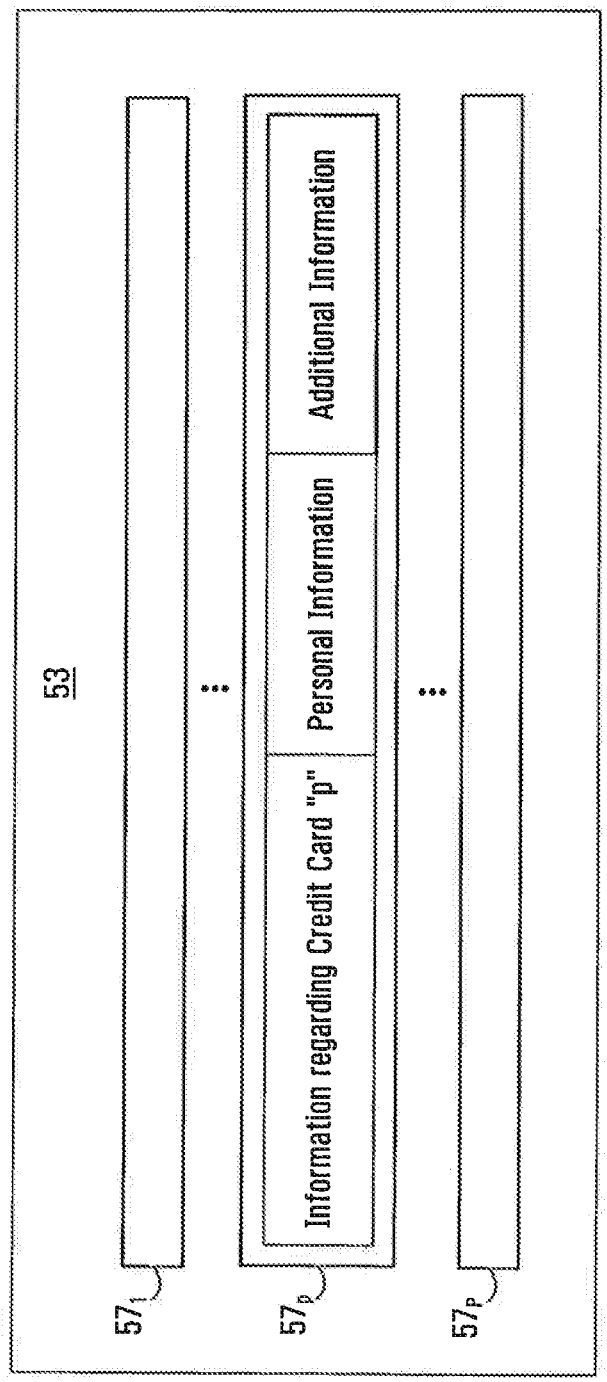
FIG. 4 shows an example of potential contents of a database accessible to the transaction validation server shown in FIGS. 3A and 3B.

Also, for purposes of this example, the transaction validation server 51 has access to the aforementioned database 53, With additional reference to FIG. 4, there is shown an example of potential contents of the database 53 in this case. The database 53 stores a plurality of records $57_1 \ldots 57_P$. In this example, each of the records $57_1 \ldots 57p$ is associated with a credit card and includes information regarding that credit card (i.e., credit card information). A record $57_p$ ($1 \leq p \leq P$) also includes personal information regarding a party to which has been issued the credit card associated with that record. For instance, this personal information may include a name, a gender, a date of birth or an age, a nationality, a correspondence language, a civic address (e.g., a residential or work address), a phone number (e.g., a residential, work, or mobile phone number), and/or an email address of the party. Other personal information regarding the party may be included. Also, in some cases, the party may be more than one person, in which cases the record $57_p$ may include personal information regarding each such person. The personal information regarding the party may be included in the record $57_p$ as a result of interaction between the party and the card issuing bank (e.g., when the party requests to obtain the credit card in question). Each of the records $57_1 \ldots 57_p$ also includes additional information used to process an online transaction attempted to be made using the credit card associated with that record. For instance, this additional information may include a credit limit, a balance due, a list of recent transactions, etc.

Thus, referring to FIG. 3A, the user 10 interacts with the network site implemented by the server $30_n$ using the computing device 16 of the communication apparatus 12 in order to select the product or service that he/she desires to purchase. This may involve the user 10 using an online shopping cart implemented by the server $30_n$. Upon selecting the desired product or service, the user 10 indicates that he/she desires to purchase that product or service, for instance, by selecting a "check-out" option on the network site.

The network site then prompts the user 10 to provide payment information to pay for the selected product or service. In this example, the user 10 thus proceeds to enter credit card information (e.g., a card number, an expiry date, and/or a cardholder's name) regarding the particular credit card. The user 10 then indicates his/her intent to submit an order to purchase the selected product or service using the entered credit card information, for instance, by selecting a "submit order" option on the network site.

At this point, the computing device 16 of the communication apparatus 12 transmits to the server $30_n$ a message 102. In this example, the message 102 conveys (i) order information indicative of the selected product or service; (ii) purchase amount information indicative of an amount to be paid to purchase the selected product or service; and (iii) the credit card information entered by the user 10 to purchase the selected product or service. The message 102 may also convey the logical identifier assigned to the communication apparatus 12. Alternatively, the logical identifier assigned to the communication apparatus 12 may not be conveyed by the message 102 but may already be known to the server $30_n$ due to prior interaction between the computing device 16 and the server $30_n$.

Since it travels over the public packet-switched network 14, the information to be transmitted to the server $30_n$ as part of the message 102 may be encrypted by the computing device 16 prior to being transmitted to the server 30n. This encryption may be effected using the Secure Socket Layer (SSL) protocol or some other encryption technique, by virtue of interaction between the computing device 16 and the server 30$_n$.

Upon receiving the message 102, the server 30$_n$ processes the message 102, possibly decrypting one or more of its portions, and proceeds to send a message 104 to a payment gateway 60. The payment gateway 60 is a network element that is connected to a financial network 68 and that is used by the server 30$_n$ to process online transactions attempted to be made via the network site implemented by the server 30$_n$. The financial network 68 interconnects a plurality of servers or other computers associated with banks and/or other financial institutions, including, in this example, the transaction validation server 51 that is associated with the card issuing bank and a server 70 that is associated with an acquiring bank, i.e., a financial institution that is used by an entity, in this case, a merchant, which operates, manages or is otherwise associated with the server 30$_n$.

The message 104 sent to the payment gateway 60 may be identical to the message 102, i.e., it may be a relayed version of the message 102. Alternatively, the message 104 may be generated by the server 30$_n$ based on the message 102 and possibly other information known to the server 30$_n$ (e.g., the logical identifier assigned to the communication apparatus 12, if not conveyed by the message 102 but already known to the server 30$_n$). In this example, the message 104 conveys (i) the purchase amount information indicative of an amount to be paid to purchase the selected product or service; (ii) the credit card information entered by the user 10 to purchase the selected product or service; and (iii) the logical identifier assigned to the communication apparatus 12. Here again, information conveyed by the message 104 may be encrypted prior to transmission to the payment gateway 60.

Upon receiving the message 104, the payment gateway 60 processes the message 104, possibly decrypting one or more of its portions. Based on content of the message 104, the payment gateway 60 determines that it originates from the server 30$_n$ and proceeds to send a message 106, over the financial network 68, to the server 70, which is associated with the acquiring bank used by the merchant associated with the server 30$_n$. The message 106, which can be viewed as a request for transaction authorization, is intended to elicit from the financial network 68 a response as to whether the online transaction requested by the user 10 is approved or denied. In this example, the payment gateway 60 generates the message 106 based on the message 104 such that the message 106 conveys (i) the purchase amount information indicative of an amount to be paid to purchase the selected product or service; (ii) the credit card information entered by the user 10 to purchase the selected product or service; and (iii) the logical identifier assigned to the communication apparatus 12.

The server 70 receives the message 106 and processes it to gain knowledge that a transaction involving the merchant associated with the server 30$_n$ is attempted to be effected. Based on the credit card information conveyed by the message 106, the server 70 proceeds to send a message 108 to the transaction validation server 51 over the financial network 68. The message 108 may be identical to the message 106, i.e., it may be a relayed version of the message 106. Alternatively, the message 108 may be generated by the server 70 based on the message 106 and possibly other information known to the server 70. In this example, the message 108 conveys (i) the purchase amount information indicative of an amount to be paid to purchase the selected product or service; (ii) the credit card information entered by the user 10 to purchase the selected product or service; and (iii) the logical identifier assigned to the communication apparatus 12.

The transaction validation server 51, which is associated with the card issuing bank that issued the particular credit card that has been used by the user 10 in making the request to purchase the selected product or service, receives the message 108. The transaction validation server 51 proceeds to process the message 108 to determine whether the online transaction requested by the user 10 is to be approved or denied.

As part of its operation, in accordance with an embodiment of the present invention and as a measure to counter fraudulent online transactions, the transaction validation server 51 uses personal information regarding a party to which has been issued the particular credit card used by the user 10 in order to determine whether the online transaction requested by the user 10 is to be approved or denied.

More particularly, in this embodiment, the transaction validation server 51 consults the database 53 to identify a particular one of the records 57$_1$ . . . 57$_p$ that includes information matching the credit card information conveyed by the message 108. Upon identifying the particular one of the records 57$_1$ . . . 57$_p$, the transaction validation server 51 obtains therefrom personal information regarding a party to which has been issued the particular credit card associated with that particular record. Specifically, the transaction validation server 51 obtains one or more elements (e.g., a name, a phone number, a civic address, and/or an email address) of the personal information included in the particular one of the records 57$_1$ . . . 57$_p$.

For purposes of this example, assume that the transaction validation server 51 obtains from the particular one of the records 57$_1$ . . . 57$_p$ a name of the party to which has been issued the particular credit card used by the user 10 and associated with that particular record. It will be appreciated that, in other examples, various other elements of the personal information included in the particular one of the records 57$_1$ . . . 57$_p$ may be obtained by the transaction validation server 51 and used in determining whether the online transaction requested by the user 10 is to be approved or denied. It will also be appreciated that, in some cases, the personal information used by the transaction validation server 51 in determining whether the online transaction requested by the user 10 is to be approved or denied may be obtained by the transaction validation server 51 directly from the credit card information entered by the user 10 and conveyed by the message 108. For example, in some cases, the credit card information entered by the user 10 and conveyed by the message 108 may include a cardholder's name appearing on the particular credit card (i.e., the name of the party to which has been issued the particular credit card), in which cases this name may be obtained by the transaction validation server 51 directly from the message 108, rather than being obtained from the particular one of the records 57$_1$ . . . 57$_p$.

Thus, in accordance with an embodiment of the present invention, the transaction validation server 51 effects a verification as to whether the name of the party to which has been issued the particular credit card used by the user 10 corresponds to a name included in a profile associated to the logical identifier assigned to the communication apparatus 12 used by the user 10. To that end, the transaction validation server 51 interacts with the profile information server 34 to effect this verification on a basis of the logical identifier assigned to the communication apparatus 12 and conveyed by the message 108.

Figure 3B:
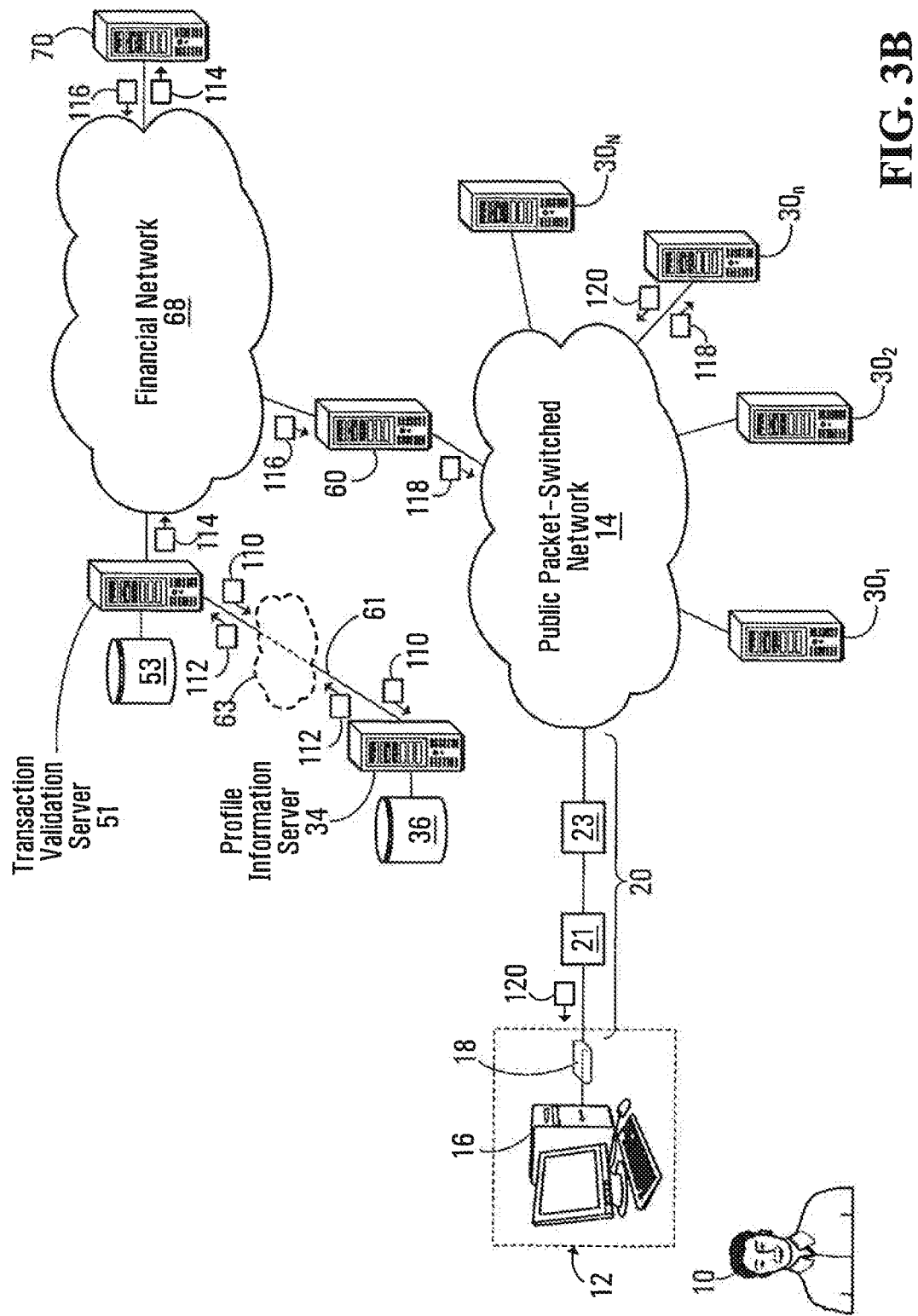

With reference to FIG. 3B, the transaction validation server 51 sends a message 110 to the profile information server 34 over the communication link 61. In this embodiment, the message 110 can be viewed as a request to confirm whether the logical identifier assigned to the communication apparatus 12 (and conveyed by the to message 108) is associated with a profile which includes a name that corresponds to name of the party to which has been issued the particular credit card used by the user 10 (i.e., the name obtained from the particular one of the records $57_1 \ldots 57_P$). The message 110 thus conveys the logical identifier assigned to the communication apparatus 12 and the name of the party to which has been issued the particular credit card used by the user 10.

The profile information server 34 receives the message 110 and proceeds to process it. More particularly, in this embodiment, the profile information server 34 extracts the logical identifier assigned to the communication apparatus 12 and conveyed by the message 110, and consults the profile information database 36 in an attempt to find a particular one of the records $40_1 \ldots 40_M$ that corresponds to this logical identifier.

If the profile information server 34 is unable to find a particular one of the records $40_1 \ldots 40_M$ that corresponds to the logical identifier assigned to the communication apparatus 12 and conveyed by the message 110, the profile information server 34 may send to the transaction validation server 51 a message (not shown) indicating that no profile associated with this logical identifier, and thus no name included in such profile, can be found. Upon receiving this message, the transaction validation server 51 may take remedial action. For example, the transaction validation server 51 may deny the online transaction attempted to be made using the communication apparatus 12 without performing any further processing operation to assess whether it should be approved or denied. Alternatively, the transaction validation server 51 may perform additional processing operations to determine whether the online transaction requested by the user 10 is to be approved or denied, including processing operations to re-assess legitimacy of the online transaction requested by the user 10, i.e., to probe more deeply into whether the user 10 legitimately used the credit card information conveyed by the message 108. For instance, these additional processing operations may effect conventional verifications, such as a card security code (CSC) verification whereby the user 10 is asked to enter the particular credit card's CSC; an address verification system (AVS) whereby the user 10 is asked to enter a billing address for the particular credit card which is compared to an actual billing address known to the card issuing bank; a phone call to a party to which the card issuing bank issued the particular credit card to verbally confirm legitimacy of the online transaction requested by the user 10, etc.

For purposes of this example, assume that a particular one of the records $40_1 \ldots 40_M$ corresponds to the logical identifier assigned to the communication apparatus 12 and conveyed by the message 110. The profile information server 34 thus finds the particular one of the records $40_1 \ldots 40_M$, which associates the logical identifier assigned to the communication apparatus 12 (and conveyed by the message 110) to a profile including information known to a service provider involved in assigning the logical identifier to the communication apparatus 12. This information includes personal information regarding a party to which the service provider provides a network access service. In this case, this personal information includes a name of the party to which the service provider provides a network access service. Based on the message 110, which requests a confirmation as to whether the logical identifier assigned to the communication apparatus 12 is associated with a profile which includes a name that corresponds to name of the party to which has been issued the particular credit card used by the user 10, the profile information server 34 obtains from the particular one of the records $40_1 \ldots 40_M$ the name of the party to which the service provider provides a network access service.

The profile information server 34 proceeds to compare the name of the party to which the service provider provides a network access service (obtained from the particular one of the records $40_1 \ldots 40_M$) to the name of the party to which has been issued the particular credit card used by the user 10 (conveyed by the message 110). Based on a result of this comparison, the profile information server 34 performs an action related to validation of the online transaction requested by the user 10 using the communication apparatus 12. More specifically, in this embodiment, the action performed by the profile information server 34 comprises generating and transmitting to the transaction validation server 51 a message 112 that indicates whether the name of the party to which the service provider provides a network access service (obtained from the particular one of the records $40_1 \ldots 40_M$) corresponds to the name of the party to which has been issued the particular credit card used by the user 10 (conveyed by the message 110). This action is related to validation of the online transaction requested by the user 10 since the message 112 will be used by the transaction validation server 51 to validate the online transaction, as discussed below.

The transaction validation server 51 receives the message 112 and processes it to learn whether the name of the party to which the service provider provides a network access service (obtained from the particular one of the records $40_1 \ldots 40_M$) corresponds to the name of the party to which has been issued the particular credit card used by the user 10 (conveyed by the message 110). As discussed below, the transaction validation server 51 handles the request for the online transaction made by the user 10 in different manners depending on whether the name of the party to which the service provider provides a network access service (obtained from the particular one of the records $40_1 \ldots 40_M$) corresponds to or does not correspond to the name of the party to which has been issued the particular credit card used by the user 10 (conveyed by the message 110).

If the message 112 indicates that the name of the party to which the service provider provides a network access service (obtained from the particular one of the records $40_1 \ldots 40_M$) does not correspond to the name of the party to which has been issued the particular credit card used by the user 10 (conveyed by the message 110), the transaction validation server 51 concludes based on the message 112 that legitimacy of the request for the online transaction made by the user 10 is not established. This may result in the online transaction being denied by the transaction validation server 51 without performing any further processing operation to assess whether it should be approved or denied. Alternatively, this may result in the transaction validation server 51 performing additional processing operations to determine whether the online transaction requested by the user 10 is to be approved or denied, including processing operations to re-assess legitimacy of the request for the online transaction made by the user 10, i.e., to probe more deeply into whether the user 10 legitimately used the credit card information conveyed by the message 108. For instance, and as mentioned above, these additional processing operations may effect conventional verifications, such as a card security code (CSC) verification, an address verification system (AVS), a phone call to verbally confirm legitimacy of the online transaction requested by the user 10, etc.

On the other hand, if the message 112 indicates that the name of the party to which the service provider provides a network access service (obtained from the particular one of the records $40_1 \ldots 40_M$) corresponds to the name of the party to which has been issued the particular credit card used by the user 10 (conveyed by the message 110), the transaction validation server 51 concludes based on the message 112 that legitimacy of the request for the online transaction made by the user 10 is established. In other words, the transaction validation server 51 concludes based on the message 112 that the request for the online transaction made by the user 10 is legitimate, i.e., that the user 10 legitimately used the credit card information entered at step 200 and conveyed in the message 108.

The transaction validation server 51 proceeds to perform other processing operations to determine whether the online transaction requested by the user 10 is to be approved or denied. Approval or denial of the online transaction can be determined based on various factors. For example, based on the additional information (e.g., a credit limit, a balance due, etc.) included in the particular one of the records $57_1 \ldots 57_P$ and the purchase amount information indicative of an amount to be paid to purchase the selected product or service that is conveyed by the message 108, the transaction validation server 51 may determine whether the online transaction is to be approved or denied. It will be appreciated that approval or denial of the online transaction may be determined by the transaction validation server 51 based on other factors.

Upon determining whether the online transaction is approved or denied, the transaction validation server 51 sends a message 114 to the server 70 over the financial network 68. The message 114 indicates whether the online transaction is approved or denied. If the online transaction is denied, the message 114 may indicate (e.g., by a code) a reason for this denial, such as insufficient funds, an unavailable bank link, etc.

The server 70 receives the message 114 and processes it to know whether the online transaction is approved or denied. If approved, the online transaction is eventually settled via a settlement process involving the acquiring bank and the card issuing bank. This settlement process is well known and thus not described herein.

The server 70 proceeds to send a message 116 to the payment gateway 60. The message 116 may be identical to the message 114, i.e., it may be a relayed version of the message 114. Alternatively, the message 116 may be generated by the server 70 based on the message 114. The message 116 indicates whether the online transaction is approved or denied and, if applicable, may indicate a reason for denial of the online transaction.

Upon receiving the message 116, the payment gateway 60 processes it and proceeds to send a message 118 to the server $30_n$. Generated by the payment gateway 60 on a basis of the message 116, the message 118 indicates whether the online transaction is approved or denied and, if applicable, may indicate a reason for denial of the online transaction. Information conveyed by the message 118 may be encrypted by the payment gateway 60 prior to being transmitted to the server $30_n$.

The server $30_n$ receives the message 118. The server $30_n$ processes the message 118, possibly decrypting one or more of its portions, to ascertain whether the online transaction is approved or denied. Approval or denial of the online transaction (and a reason for denial, if applicable) may be recorded by the server $30_n$ for future reference. The server $30_n$ proceeds to send a message 120 to the computing device 16 of the communication apparatus 12 in order to communicate approval or denial of the online transaction to the user 10. Since it travels over the public packet-switched network 14, information conveyed by the message 120 may be encrypted by the server $30_n$ prior to being transmitted to the computing device 16.

Upon receiving the message 120, the computing device 16 processes the message 120, possibly decrypting one or more of its portions, so as to communicate approval or denial of the online transaction to the user 10. For example, this may be achieved by displaying a "transaction approved" or "transaction denied" message (or any conceivable variant thereof) on the display of the computing device 16.

It will thus be appreciated that validation of the online transaction requested by the user 10 can be effected using information known to the service provider involved in assigning the logical identifier to the communication apparatus. This enables the transaction validation server 51 to conveniently and efficiently establish legitimacy of the request for the online transaction made by the user 10 in a way that is transparent to the user 10.

While the above-described example illustrates one possible manner of verifying whether the name of the party to which has been issued the particular credit card used by the user 10 corresponds to a name included in a profile associated to the logical identifier assigned to the communication apparatus 12 used by the user 10, it will be appreciated that this verification may be effected in various other manners in other embodiments.

Figure 3C:
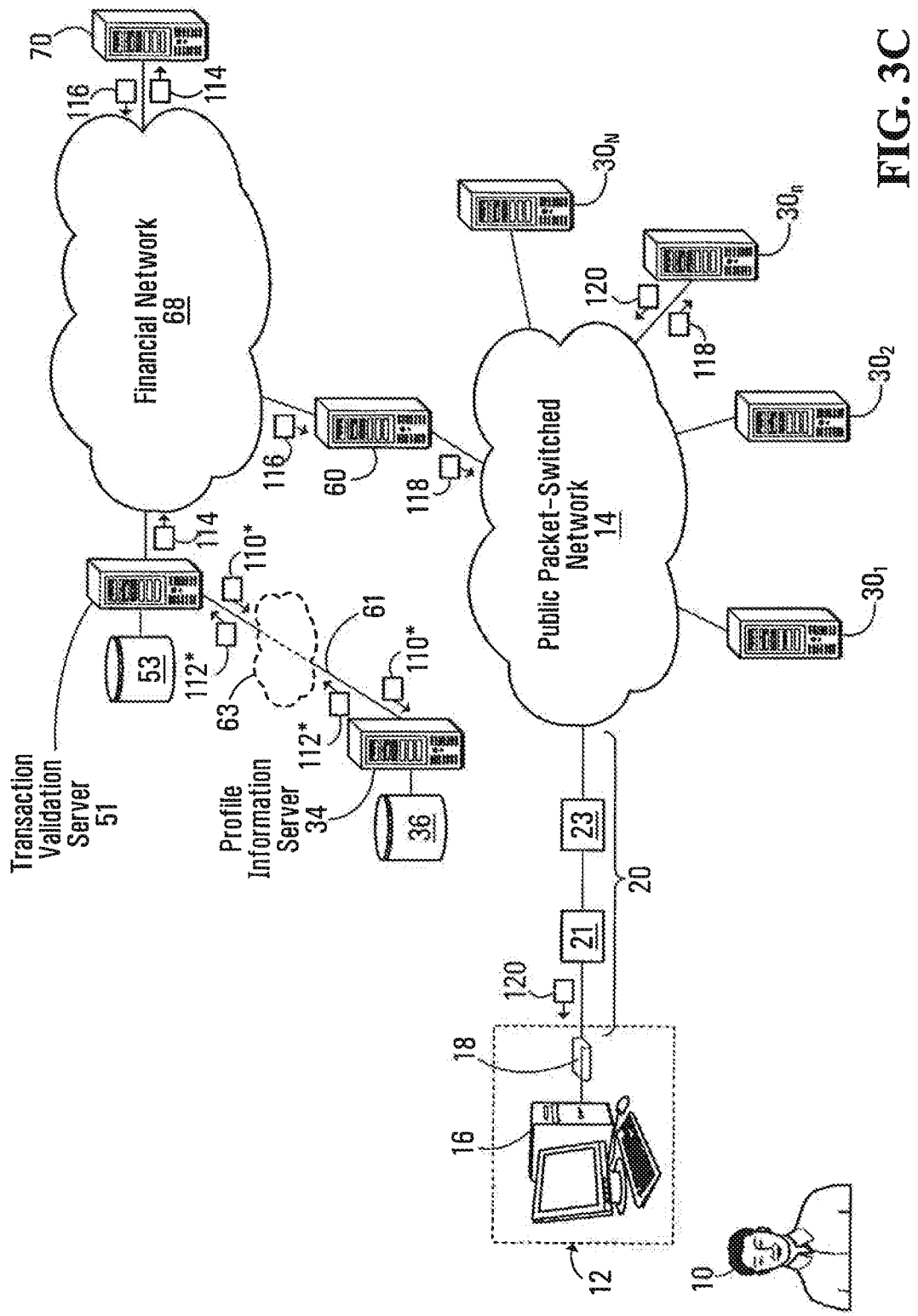
FIG. 3C illustrates a variant to the example considered in FIGS. 3A and 3B.

For example, FIG. 3C illustrates one possible variant. In this variant, messages have been exchanged as described above in connection with FIG. 3A, leading up to receipt of the message 108 by the transaction validation server 51, which proceeds to process the message 108 to determine whether the online transaction requested by the user 10 is to be approved or denied.

The transaction validation server 51 sends a message 110* to the profile information server 34 over the communication link 61. In this embodiment, the message 110* can be viewed as a request to obtain a name included in a profile that is associated with the logical identifier assigned to the communication apparatus 12 (and conveyed by the message 108). The message 110* thus conveys the logical identifier assigned to the communication apparatus 12.

The profile information server 34 receives the message 110* and proceeds to process it. More particularly, in this embodiment, the profile information server 34 extracts the logical identifier assigned to the communication apparatus 12 and conveyed by the message 110*, and consults the profile information database 36 in an attempt to find a particular one of the records $40_1 \ldots 40_M$ that corresponds to this logical identifier.

If the profile information server 34 is unable to find a particular one of the records $40_1 \ldots 40_M$ that corresponds to the logical identifier assigned to the communication apparatus 12 and conveyed by the message 110*, the profile information server 34 may send to the transaction validation server 51 a message (not shown) indicating that no profile associated with this logical identifier, and thus no name included in such profile, can be found. Upon receiving this message, the transaction validation server 51 may take remedial action. For example, the transaction validation server 51 may deny the online transaction attempted to be made using the communication apparatus 12 without performing any further processing operation to assess whether it should be approved or denied. Alternatively, the transaction validation server 51 may perform additional processing operations to determine whether the online transaction requested by the user 10 is to be approved or denied, including processing operations to re-assess legitimacy of the online transaction requested by the user 10, i.e., to probe more deeply into whether the user 10 legitimately used the credit card information conveyed by the message 108. For instance, these additional processing operations may effect conventional verifications, such as a card security code (CSC) verification whereby the user 10 is asked to enter the particular credit card's CSC; an address verification system (AVS) whereby the user 10 is asked to enter a billing address for the particular credit card which is compared to an actual billing address known to the card issuing bank; a phone call to a party to which the card issuing bank issued the particular credit card to verbally confirm legitimacy of the online transaction requested by the user 10, etc.

For purposes of this example, assume that a particular one of the records $40_1 \ldots 40_M$ corresponds to the logical identifier assigned to the communication apparatus 12 and conveyed by the message 110*. The profile information server 34 thus finds the particular one of the records $40_1 \ldots 40_M$, which associates the logical identifier assigned to the communication apparatus 12 (and conveyed by the message 110*) to a profile including information known to a service provider involved in assigning the logical identifier to the communication apparatus 12. This information includes personal information regarding a party to which the service provider provides a network access service. In this case, this personal information includes a name of the party to which the service provider provides a network access service. The profile information server 34 thus obtains from the particular one of the records $40_1 \ldots 40_M$ the name of the party to which the service provider provides a network access service.

The profile information server 34 proceeds to perform an action related to validation of the online transaction requested by the user 10 using the communication apparatus 12. In this embodiment, the action performed by the profile information server 34 comprises generating and transmitting to the transaction validation server 51 a message 112* that conveys the name obtained from the particular one of the records $40_1 \ldots 40_M$, i.e., the name of the party to which the service provider provides a network access service. This action is related to validation of the online transaction requested by the user 10 since the message 112* will be used by the transaction validation server 51 to validate the online transaction, as discussed below.

The transaction validation server 51 receives the message 112* and processes it. More particularly, the transaction validation server 51 compares the name of the party to which the service provider provides a network access service (obtained from the particular one of the records $40_1 \ldots 40_M$ of the database 36) to the name of the party to which has been issued the particular credit card used by the user 10 (obtained from the particular one of the records $57_1 \ldots 57_P$ of the database 53 at step 240). Based on a result of this comparison, the transaction validation server 51 performs an action related to validation of the online transaction requested by the user 10 using the communication apparatus 12. More specifically, in this embodiment, the action performed by the transaction validation server 51 comprises validating the online transaction requested by the user 10 in different manners depending on a result of this comparison.

If the name of the party to which the service provider provides a network access service (obtained from the particular one of the records $40_1 \ldots 40_M$) does not correspond to the name of the party to which has been issued the particular credit card used by the user 10 (obtained from the particular one of the records $57_1 \ldots 57_P$), the transaction validation server 51 concludes that legitimacy of the request for the online transaction made by the user 10 is not established. This may result in the online transaction being denied by the transaction validation server 51 without performing any further processing operation to assess whether it should be approved or denied. Alternatively, this may result in the transaction validation server 51 performing additional processing operations to determine whether the online transaction requested by the user 10 is to be approved or denied, including processing operations to re-assess legitimacy of the request for the online transaction made by the user 10, i.e., to probe more deeply into whether the user 10 legitimately used the credit card information entered at step 200 and conveyed in the message 108. For example, as mentioned above, these additional processing operations may effect conventional verifications, such as a card security code (CSC) verification, an address verification system (AVS), a phone call to verbally confirm legitimacy of the online transaction requested by the user 10, etc.

On the other hand, if the name of the party to which the service provider provides a network access service (obtained from the particular one of the records $40_1 \ldots 40_M$) corresponds to the name of the party to which has been issued the particular credit card used by the user 10 (obtained from the particular one of the records $57_1 \ldots 57_P$), the transaction validation server 51 concludes that legitimacy of the request for the online transaction made by the user 10 is established. In other words, the transaction validation server 51 concludes that the request for the online transaction made by the user 10 is legitimate, i.e., that the user 10 legitimately used the credit card information entered at step 200 and conveyed in the message 108.

The transaction validation server 51 proceeds to perform other processing operations to determine whether the online transaction requested by the user 10 is to be approved or denied. Approval or denial of the online transaction can be determined based on various factors. For example, based on the additional information (e.g., a credit limit, a balance due, etc.) included in the particular one of the records $57_1 \ldots 57_P$ and the purchase amount information indicative of an amount to be paid to purchase the selected product or service that is conveyed by the message 108, the transaction validation server 51 may determine whether the online transaction is to be approved or denied. It will be appreciated that approval or denial of the online transaction may be determined by the transaction validation server 51 based on other factors.

Upon determining whether the online transaction is approved or denied, the transaction validation server 51 sends the message 114 to the server 70 over the financial network 68, as described above in connection with FIG. 3B. This variant then continues as described above in connection with FIG. 3B.

While this variant illustrates another possible manner of verifying whether the name of the party to which has been issued the particular credit card used by the user 10 corresponds to a name included in a profile associated to the logical identifier assigned to the communication apparatus 12 used by the user 10, it will be appreciated that this verification may be effected in various other manners in other embodiments.

Although the example considered above relates to an online transaction involving an online purchase using a credit card, principles described herein apply to other types of online transactions, including, for example, those involving online purchases or payments using other payment objects (e.g., digital cash, electronic checks) or online fund transfers involving accounts (e.g., bank accounts, online wallet accounts).

Also, while in the example considered above the online request made using the communication apparatus 12 is a request for an online transaction, principles described herein apply to other types of online requests, including a request for a delivery of a product or service to a particular place, a request for an access to online private content, a request for an access to a private network, a request for a download of data, or any other request that can be made online.

In addition, while in the example considered above the online request made using the communication apparatus 12 is handled on a basis of a name known to a service provider involved in assigning the logical identifier to the communication apparatus 12, other information known to the service provider and part of the profile associated with this logical identifier may be used in other cases, depending on the nature of the online request being made. For example, where the online request is a request for a delivery of a product or service to a particular place, a civic address known to the service provider may be used to handle the requested delivery; where the online request is a request for a download of data to the communication apparatus 12, a bandwidth known to the service provider to be available to the communication apparatus 12 may be used to handle the requested download of data; etc.

Furthermore, while in the above-considered example certain messages are exchanged between various elements of the architecture depicted in FIG. 1, it will be appreciated that different messages may be exchanged in other embodiments.

Moreover, although in the above-considered example the transaction validation server 51 interacts with the profile information server 34, it will be appreciated that, in other embodiments, other network elements may interact with the profile information server 34 as part of a process to handle an online request made by the user 10 via the communication apparatus 12. For example, in some embodiments, and depending on the nature of the online request, the payment gateway 60, the server 70, the server $30_n$ or any other network element may interact with the profile information server 34 as part of a process to handle an online request made by the user 10 via the communication apparatus 12.

Also, while the above-described example relates to an online request made over the public packet-switched network 14, it will be recognized that principles described herein can be applied to an online request made over a private packet-switched network.

Figure 5:
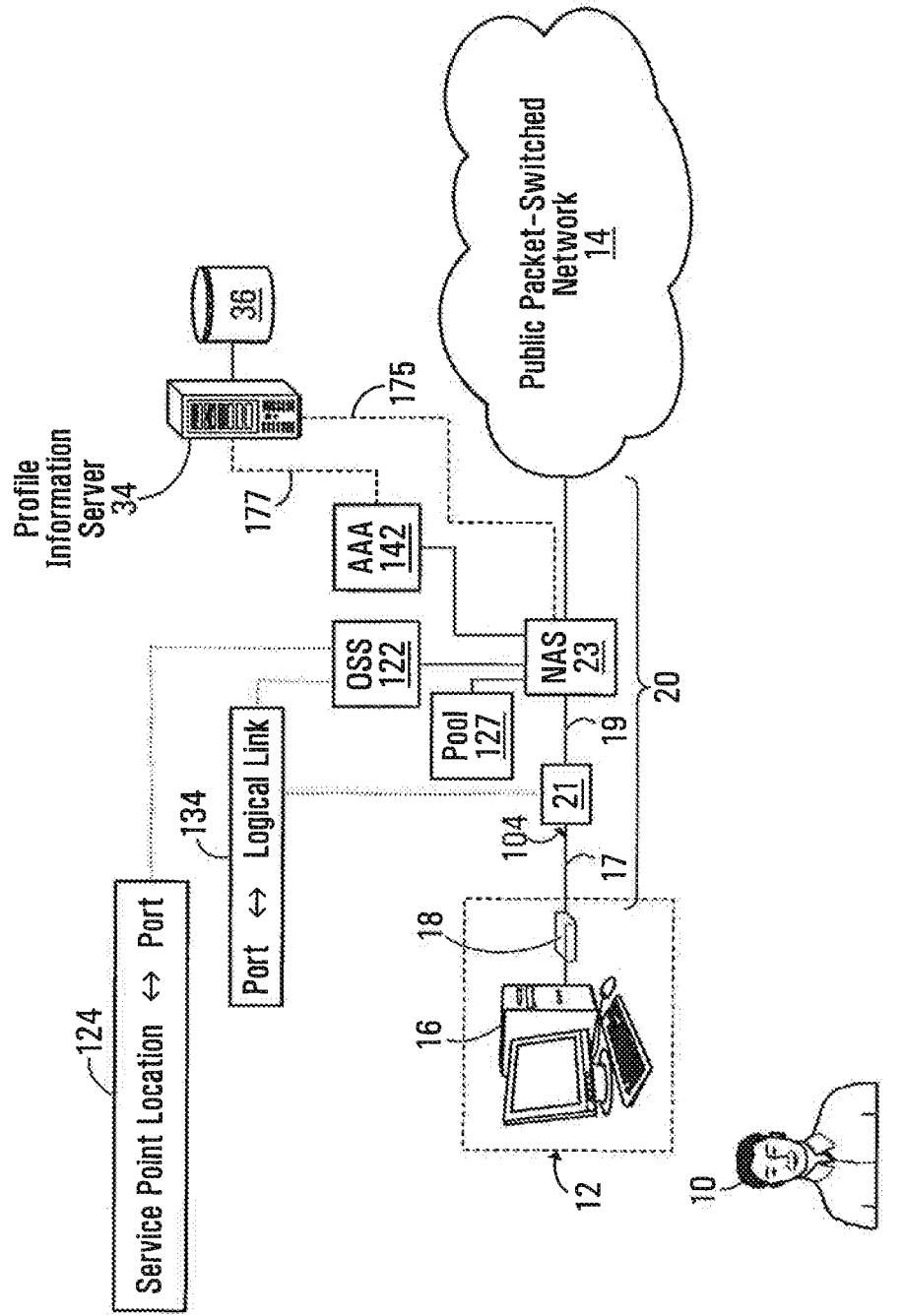
FIGS. 5 to 7 illustrate an example process by which the profile information database of the architecture shown in FIG. 1 may be populated, in accordance with an embodiment of the present invention.

Turning now to FIG. 5, an example process by which the profile information database 36 may be populated will be described. It is recalled that the profile information database 36 stores the records $40_1 \ldots 40_M$ that associate logical identifiers to profiles which include information known to one or more service providers involved in assigning these logical identifiers.

This example will illustrate one possible manner by which an association between the logical identifier assigned to the communication apparatus 12 and a profile including information known to a service provider involved in assigning the logical identifier to the communication apparatus 12, may be stored in the profile information database 36 as part of one of the records $40_1 \ldots 40_M$.

In this example, a given service provider owning, managing or otherwise associated with one or more network elements of the communication link 20 connecting the communication apparatus 12 to the public packet-switched network 14 provides a network access service to a given party (who may or may not be the user 10) occupying, owning, managing or otherwise associated with premises where the communication apparatus 12 is located. In order to benefit from the network access service, the given party has a business relationship with the given service provider. As part of this business relationship, the given party interacts with the given service provider (e.g., during a registration or service activation phase) to provide personal information regarding itself. For example, this personal information may include a name, a gender, a date of birth or an age, a nationality, a correspondence language, a civic address (e.g., a residential or work address), a phone number (e.g., a residential, work, VoIP or mobile phone number), an email address, and/or an IM identifier of the given party. If the given party is more than one person, personal information regarding each such person may be provided. During interaction with the given service provider, the given party also indicates a service point location (e.g., a service address) where the network access service is to be delivered, selects a level of service to be obtained, provides billing information (e.g., a billing address and/or credit card information) to pay for the network access service, etc. Interaction between the given party and the given service provider may take place via a customer service representative of the given service provider or via a web site implemented by the given service provider.

The given service provider stores in the profile information database 36 a profile associated with the given party, in which is included information provided by the given party while interacting with the given service provider and possibly other information not obtained from the given party but pertaining to the network access service provided to the given party.

In this example, the infrastructure described above in connection with FIG. 1 and partly shown in FIG. 5 comprises an operation support system (OSS) 122. The OSS 122 represents a collection of systems that perform management, inventory, engineering, planning, repair and other functions for the given service provider. In this light, one of the functions of the OSS 122 may include management of network elements, assets and equipment. Thus, the OSS 122 maintains a mapping 124 between, on the one hand, ports of various access multiplexers or other network elements under control of the given service provider and, on the other, service point locations of communication apparatus (such as the communication apparatus 12) connected to those ports. In this case, the mapping 124 maintained by the OSS 122 relates a port 104 of the network element 21 to a service point location, i.e., the location of a service point where the communication apparatus 12 is located. As mentioned previously, this service point location may be expressed as a civic address, a set of geo-coordinates, or any other information identifying where the service point is located.

Also, in this example, the network element 21 of the communication link 20 connecting the communication apparatus 12 to the public packet-switched network 14 is an access multiplexer under control of the given service provider. In one embodiment, the access multiplexer 21 may be a DSLAM.

The access multiplexer 21 is connected to the network element 23, which, in this embodiment, is a network access server (NAS) operated by the given service provider. The NAS 23, which may also sometimes be referred to as a broadband remote access server (BRAS), a remote access server (RAS) or a broadband access server (BAS), provides access to the public packet-switched network 14. Communication between the access multiplexer 21 and the NAS 23 can take place over the dedicated logical link 19 between these elements. The dedicated logical link 19, which may traverse an intervening access data network (not shown), can be implemented in various ways. For example, in one embodiment, the dedicated logical link 19 may be implemented as an asynchronous transfer mode (ATM) permanent virtual circuit (PVC). In another embodiment, the dedicated logical link 19 may be implemented as a virtual local area network (VLAN). It will be appreciated that various other implementations of the dedicated logical link 19 are possible.

The access multiplexer 21 allows data arriving from the NAS 23 along given ATM PVCs, VLANs or other dedicated logical links to be sent over corresponding physical links via corresponding one of its ports, and vice versa. Thus, the access multiplexer 21 can be said to implement a mapping 134 between, on the one hand, dedicated logical links and, on the other, ports of the access multiplexer 21. In this example, the mapping 134 implemented by the access multiplexer 21 relates the dedicated logical link 19 to the port 104 of the access multiplexer 21, In two example embodiments, the mapping 134 can be maintained by either the access multiplexer 21 or the OSS 122.

The infrastructure shown in FIG. 5 further comprises an authorization element 142 connected to the NAS 23, The nature of the connection between the NAS 23 and the authorization element 142 is immaterial. For example, in one embodiment, the authorization element 142 may be a server (e.g., an Authentication, Authorization, and Accounting (AAA) server) responsive to queries from the NAS 23. In such an embodiment, the authorization element 142 and the NAS 23 may communicate using the Remote Authentication Dial In User Service (RADIUS) protocol, a description of which is available at www.ietf.org/rfc/rfc2865.txt. In another embodiment, the authorization element 142 may be a functional element integrated with the NAS 23.

In this example, the NAS 23 is operative to maintain a pool 127 of logical identifieres that can be used by various communication apparatus, including the communication apparatus 12. In some embodiments, the pool 127 of addresses may be built up as a cooperative effort between the NAS 23 and the OSS 122, while in other embodiments, it may not be necessary for the OSS 122 to be involved in creating the pool 127 of logical identifiers. In still other embodiments, the pool 127 of logical identifiers may be maintained by the authorization element 142, and may be made accessible to the authorization element 142 without needing to pass through the NAS 23.

The profile information server 34, and the profile information database 36 that it has access to, can be linked to other components of the infrastructure of FIG. 5 in various ways. For example, in one embodiment, the profile information server 34 may be connected to the NAS 23 by a link 175. In another embodiment, the profile information server 34 may be connected to the authorization element 142 by a link 177. The nature of the connection between the profile information server 34 and either the NAS 23 or the authorization element 142 is immaterial. In other embodiments, the profile information server 34 may be part of either the OSS 122, the NAS 23 or the authorization element 142.

As previously mentioned, in some embodiments, the profile information server 34 and the profile information database 36 may be part of separate network elements and communicatively coupled to one another via a communication link, which may traverse one or more network elements and comprise one or more physical links and one or more logical links. In other embodiments, the profile information server 34 and the profile information database 36 may be part of a common network element. In yet other embodiments, the profile information database 36 may be distributed amongst a plurality of network elements and/or physical locations. Also, it should be appreciated that the profile information database 36 may be managed, maintained and/or updated by an entity that may be the given service provider or a different entity.

It will be appreciated that numerous modifications and variations of the infrastructure of FIG. 5 are possible. For example, in some embodiments, the access multiplexer 21 can be omitted. This may be true in embodiments where the communication apparatus 12 implements a wireless access point. For instance, in such embodiments, the connection between the wireless access point and the NAS 23 may be provided by a dedicated point-to-point link. As another example, in some embodiments, instead of the dedicated logical link 19, there may be a shared link leading to the communication apparatus 12.

Figure 6:
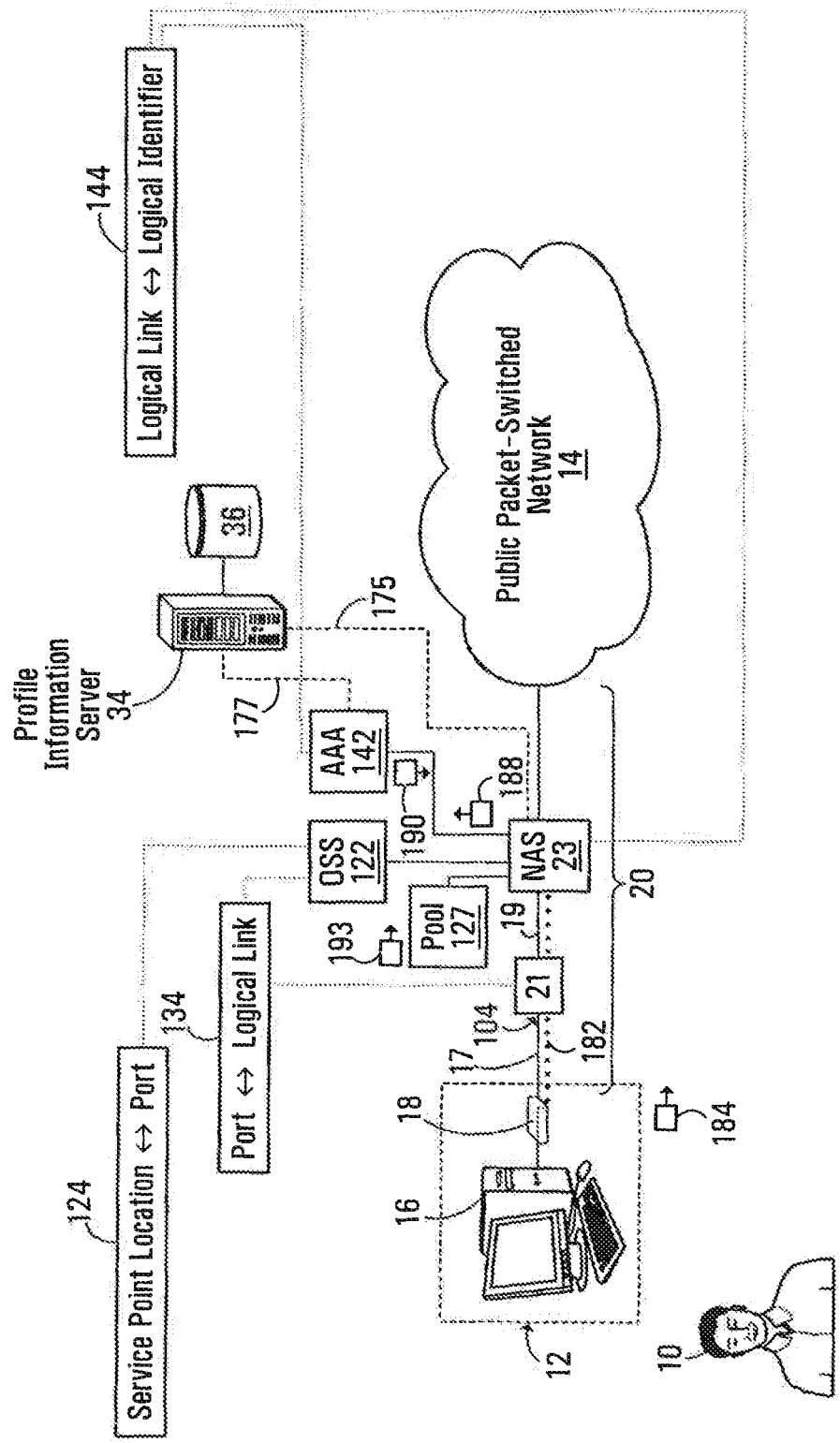

Reference is now made to FIG. 6, which illustrates an example of a possible event flow upon activation of the communication apparatus 12, which may occur, for instance, as the network interface unit 18 and/or the computing device 16 of the communication apparatus 12 is/are powered up. Thereafter:

The communication apparatus 12 establishes physical layer connectivity with the access multiplexer 21 over the physical link 17.

This is followed by establishment of Ethernet connectivity between the communication apparatus 12 and the access multiplexer 21.

The communication apparatus 12 verifies its ability to communicate using Point-to-Point Protocol over Ethernet (PPPoE). For a more detailed explanation of PPPoE, one may refer to Internet Request For Comments (RFC) 2516, available from the Internet Engineering Task Force (http://www.ietf.org), hereby incorporated by reference herein.

Next, assuming that the communication apparatus 12 has the ability to communicate using PPPoE, the communication apparatus 12 verifies whether it should make a so-called "access request" automatically or in response to user input (which can be obtained via a software application). For purposes of this example, let it be assumed that conditions have been met such that the communication apparatus 12 should make an access request.

The communication apparatus 12 begins entry into PPPoE communication by broadcasting an "initiation" packet over the dedicated logical link 19.

The NAS 23 responds to receipt of the initiation packet by sending an "offer" packet to the communication apparatus 12. Thus, at this stage, it can be said that a logical connection 182 has been defined between a first endpoint (the communication apparatus 12) and a second endpoint (the NAS 23).

Following receipt of the offer packet, the communication apparatus 12 sends an access request 184 to the NAS 23 with the ultimate goal of accessing the public packet-switched network 14. The access request 184 may comprise credentials that can be hard coded or programmably installed on the communication apparatus 12. Alternatively, the credentials may be entered by the user 10 of the communication apparatus 12.

Upon receipt of the access request 184 containing the credentials along the dedicated logical link 19, the NAS 23 executes an authorization procedure as follows. The NAS 23 communicates the credentials to the authorization element 142, e.g., via a RADIUS Access-Request message 188. In response to receipt of the credentials from the NAS 23, the authorization element 142 determines whether the credentials allow access to the public packet-switched network 14. For example, this can be determined by consulting a database (not shown). If the credentials allow access to the public packet-switched network 14, the authorization element 142 returns an acceptance message (e.g., a RADIUS Access-Accept message). On the other hand, if the credentials do not allow access to the public packet-switched network 14, the authorization element 142 returns a refusal message (e.g., a RADIUS Access-Reject message). For purposes of this example, assume that the credentials allow access to the public packet-switched network 14, resulting in issuance of an acceptance message 190. In this example, two alternatives are possible:

Alternative 1 (where the pool 127 of logical identifieres is maintained by the authorization element 142): the authorization element 142 obtains a logical identifier 193 from the pool 127 of logical identifieres that is maintained by the authorization element 142. The logical identifier 193 is sent to the NAS 23, which assigns the logical identifier 193 to the dedicated logical link 19.

Alternative 2 (where the pool 127 of logical identifieres is maintained by the NAS 23): responsive to receipt of the acceptance message 190 from the authorization element 142, the NAS 23 obtains a logical identifier 193 from the pool 127 of logical identifieres that is maintained by the NAS 23. The logical identifier 193 so obtained is assigned by the NAS 23 to the dedicated logical link 19.

The NAS 23 sends a "confirmation" packet back to the communication apparatus 12, thus completing establishment of a PPPoE session between the endpoints of the logical connection 182.

Additional hand-shaking may be performed between the communication apparatus 12 and the NAS 23 in order to establish a Point-to-Point Protocol (PPP) session between the endpoints of the logical connection 182.

Following this, further hand-shaking may be undertaken between the communication apparatus 12 and the NAS 23 in order to establish an Internet Protocol Control Protocol (IPCP) session between the endpoints of the logical connection 182.

During the IPCP session, the NAS 23 releases the logical identifier 193 towards the communication apparatus 12 that issued the access request 184, in order to allow the communication apparatus 12 to identify itself using the logical identifier 193 in future communications over the dedicated logical link 19. Since the dedicated logical link 19 to which has been assigned the logical identifier 193 leads to the communication apparatus 12 and since the communication apparatus 12 will identify itself using the logical identifier 193 in future communications, it can be seen that the logical identifier 193 is in essence assigned to the communication apparatus 12.

It is recalled that once the logical identifier 193 has been obtained from the pool 127 of logical identifieres (either by the NAS 23 or by the authorization element 142), the NAS 23 assigns the logical identifier 193 to the dedicated logical link 19.

In an embodiment where the profile information server 34 is connected to the NAS 23 by the link 175, the fact that the NAS 23 assigns the logical identifier 193 to the dedicated logical link 19 allows the NAS 23 to construct and maintain a mapping 144 between, on the one hand, various dedicated logical links (such as the dedicated logical link 19 and others) and, on the other, logical identifieres corresponding to those dedicated logical links.

In an embodiment where the profile information server 34 is connected to the authorization element 142 by the link 177, the logical identifier 193 and the identity of the dedicated logical link 193 to which it is assigned are sent back by the NAS 23 to the authorization element 142, and it is the authorization element 142 that maintains the aforementioned mapping 144 between dedicated logical links and logical identifieres corresponding to those dedicated logical links.

Of course, those skilled in the art will be able to think of other ways of causing the communication apparatus 12 to send the access request 184 over the logical connection 182 between the communication apparatus 12 and the NAS 23, as well as other ways of assigning a logical identifier to the dedicated logical link 19 and thus to the communication apparatus 12. It should further be mentioned that, in some cases, the establishment of the aforementioned PPPoE, PPP and/or IPCP sessions may not be required. This is particularly the ease where the dedicated logical link 19 is a VLAN.

In view of the preceding description, and in particular given the previously described mappings 124, 134 maintained in the OSS 122 and/or the access multiplexer 21 and the mapping 144 maintained in the NAS 23 or the authorization element 142, the following describes how one can create an association between logical identifieres and service point locations.

Figure 7:
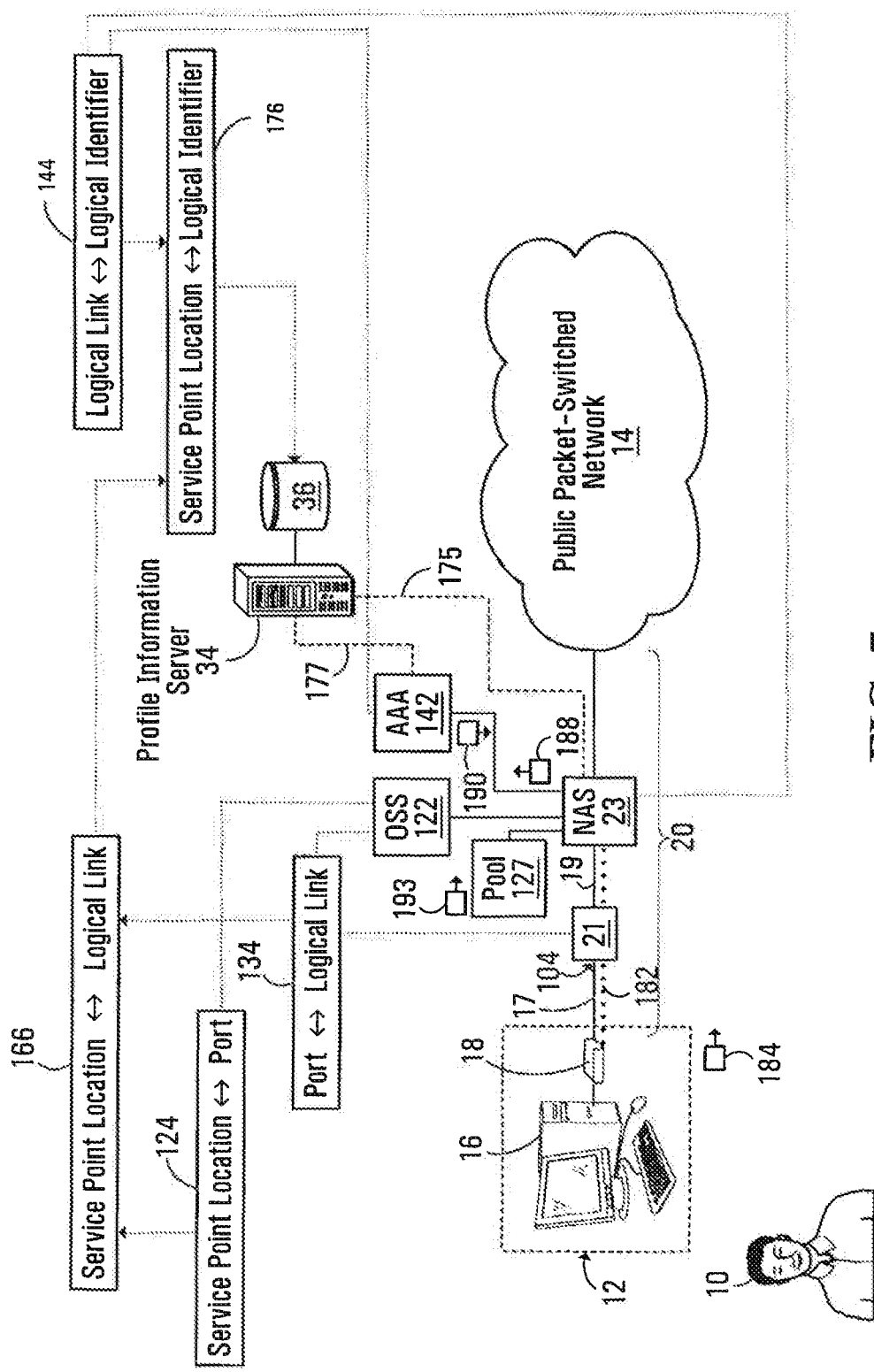

Specifically, with reference to FIG. 7, by combining the mapping 124 with the mapping 134, the OSS 122 can create an intermediate mapping 166 between, on the one hand, dedicated logical links and, on the other hand, service point locations of communication apparatus having logical connections with the NAS 23 which traverse those dedicated logical links. In this example, the intermediate mapping 166 would associate the dedicated logical link 19 to the service point location of the communication apparatus 12. In one embodiment, the OSS 122 transmits the intermediate mapping 166 to the profile information server 34.

Next, the profile information server 34 may be operative to combine the intermediate mapping 166 (received from the OSS 122) with the aforementioned mapping 144 (received from the NAS 23 or the authorization element 142), thus creating a final mapping 176 between, on the one hand, logical identifieres and, on the other, service point locations of communication apparatus having logical connections with the NAS 23 which traverse respective dedicated logical links to which those logical identifieres have been assigned. In this example, the final mapping 176 would specify that the logical identifier 193 corresponds to the service point location of the communication apparatus 12, i.e., the location of the service point where the communication apparatus 12 is located.

It is recalled that the profile associated with the given party and stored in the profile information database 36 by the given service provider includes the service point location where the network access service is to be delivered to the given party. Thus, based on the final mapping 176 specifying that the logical identifier 193 corresponds to the service point location of the communication apparatus 12, the profile information server 34 associates, in the profile information database 36, the profile associated with the given party to the logical identifier 193 assigned to the communication apparatus 12.

From the above, it should be apparent that the profile information database 36 can be populated with logical identifieres and profiles associated with these logical identifieres.

While the above-described example illustrates one possible technique for populating the profile information database 36, it will be appreciated that other techniques may be employed in other embodiments. For example, in some embodiments, the aforementioned credentials, which may be hard coded or programmably installed on the communication apparatus 12 or entered by the user 10 of the communication apparatus and which may be included in the access request 184 sent by the communication apparatus 12 to the NAS 23, can be used to associate the logical identifier 193 assigned to the communication apparatus 12 to the profile associated with the given party and stored in the profile information database 36. Specifically, these credentials, which are known by the service provider to have been provided to the given party, may be linked by the given service provider to the profile associated with the given party. Upon receiving the credentials as part of the access request 184 and assigning the logical identifier 193 to the communication apparatus 12, the given service provider may associate, in the profile information database 36, the profile associated with the given party to the logical identifier 193 assigned to the communication apparatus 12.

It will also be appreciated that, in embodiments where the logical identifier is dynamically assigned to the communication apparatus 12 (e.g., a dynamic IP address), the profile information database 36 may be updated accordingly.

Although in embodiments described above the communication apparatus 12 is directly connected to the communication link 20, it will be appreciated that, in some embodiments, the communication apparatus 12 may be connected to a router that is connected to the communication link 20 and that may be connected to one or more other communication apparatuses at premises where the communication apparatus 12 is located. In such embodiments, the router may perform network address translation (NAT) for packets passing therethrough. Depending on the type of NAT performed, in some cases, the logical identifier assigned to the communication apparatus 12 may include a portion identifying the router and a portion identifying the communication apparatus 12 connected thereto. For instance, the logical identifier assigned to the communication apparatus 12 may include an IP address assigned to the router, as well as a port number of a port of the router to which is connected the communication apparatus 12 or a local IP address assigned to the communication apparatus 12 by the router.

Also, while in embodiments considered above the profile information server 34 interacts with the request handling element 51 using the information included in the particular one of the records $40_1 \ldots 40_M$ in the profile information database 36 without the user 10 being explicitly informed of this fact, in other embodiments there may be mechanisms to notify the user 10 of this fact or confirm with the user 10 that he/she allows this information to be used by the profile information server 34 in its interaction with the request handling element 51. For example, in some embodiments, an applet, widget or other suitable element may be implemented to notify the user 10 via the computing device 16 (e.g., via a pop-up window) of the interaction between the profile information server 34 and the request handling element 51 and possibly to allow the user 10 to confirm whether information (or control which information) included in the particular one of the records $40_1 \ldots 40_M$ in the profile information database 36 can be used by the profile information server 34 as part of this interaction. As another example, the given party (who may or may not be the user 10) occupying, owning, managing or otherwise associated with premises where the communication apparatus 12 is located may have previously authorized the service provider providing the network access service to the communication apparatus 12 (e.g., during a registration phase) to use information contained in the particular one of the records $40_1 \ldots 40_M$ as part of a process to handle an online request made via the communication apparatus 12.

In addition, although embodiments described above considered online requests that the user 10 can make using the communication apparatus 12 while interacting with network sites implemented by the servers $30_1 \ldots 30_N$, it will be appreciated that, in other embodiments, the user 10 may make an online request during a telephone call established (at least partly) over the public packet-switched network 14 (or a private packet-switched network) and such online request may be handled using principles described herein. In such embodiments, the communication apparatus 12 may comprise a VoIP phone, a Plain Old Telephone Service (POTS) phone equipped with an analog terminal adapter (ATA), or a soft phone (i.e., a computer equipped with telephony software). For example, during a call with a representative a customer service representative or other employee) of a given entity (e.g., a company, governmental organization, non-profit organization, etc.), the user 10 may make a certain request. In doing so, the user 10 may verbally provide request-related information that may need to be verified in order to handle the user's request. In this case, a server operated by the given entity may determine the logical identifier assigned to the communication apparatus 12 (based on packets received during the call) and may use this logical identifier to exchange messages with the profile information server 34 in order to effect verification of the request-related information provided by the user 10. Interaction between the server operated by the given entity and the profile information server 34 may be similar to interaction between the request handling element 51 and the profile information server 34.

Those skilled in the art will appreciate that, in some embodiments, certain functionality of a given component described herein (e.g., the profile information server 34 or the request handling element 51) may be implemented as pre-programmed hardware or firmware elements (e.g., application specific integrated circuits (ASICs), electrically erasable programmable read-only memories (EEPROMs), etc.) or other related elements. In other embodiments, a given component described herein (e.g., the profile information server 34 or the request handling element 51) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes Although various embodiments of the present invention have been described and illustrated, it will be apparent to those skilled in the art that numerous modifications and variations can be made without departing from the scope of the invention, which is defined in the appended claims.

The invention claimed is:

1. A method for execution in a communications network comprising an access network, associated with a service provider, and a public packet-switched network, the method comprising:
    storing profile information of a party registering or activating network access through a service provider, the profile information storing personal information of the party and a location of the service point of the network access;
    from at least one server managed by the service provider, assigning a logical identifier to a communication apparatus connected to a port of a network element associated with the service point location, the logical identifier being used to route data associated with at least one online transaction initiated by the communication apparatus to one or more merchant servers accessible over the packet-switched network via the access network;
    determining an assigned logical identifier associated with the location service point of the profile information of the user using mappings between logical identifiers associated with ports of network elements and service point locations associated with the ports of the network elements;
    storing the assigned logical identifier determined to be associated with the service point location in association with the profile information with the service point location;
    at the at least one server, receiving from a transaction validation server distinct from the one or more merchant servers, a request message related to a current online transaction with one of the one or more merchant servers initiated from the communication device, the request message comprising a transaction-specific logical identifier of the communication device associated with the current online transaction;
    at the at least one server, in response to the request message, consulting the profile database for obtaining transaction-specific profile information associated with the transaction-specific logical identifier, the transaction-specific profile information comprising profile information stored in association with transaction-specific identifier of the current online transaction; and
    from the at least one server, performing an action related to validation of the current online transaction by sending results from the consultation of the profile database, associated with the transaction-specific logical identifier, to the transaction validation server.

2. A method as claimed in claim 1, wherein:
    assigning the logical identifier to the communication apparatus is performed at a first server of the service provider located in the access network;
    receiving the request message is performed at a profile information server of the at least one server; and
    consulting the profile database is performed by the profile information server.

3. A method as claimed in claim 1, wherein the one merchant server issues the request received by transaction validation server before being received therefrom by a profile information server of the at the at least one server.

4. A method as claimed in claim 1, wherein performing the action related to handling of the current online transaction comprises generating the results and transmitting a message indicative of whether the transaction-specific profile information corresponds to the profile information for the communication apparatus.

5. A method as claimed in claim 1, wherein performing the action related to handling of the online transaction comprises:
    handling the current online transaction in a first manner when the transaction-specific profile information corresponds to the profile information for the communication apparatus; and
    handling the current online transaction in a second manner different from the first manner when the transaction-specific profile information does not correspond to the profile information for the communication apparatus.

6. A method as claimed in claim 1, wherein the current online transaction pertains to a request for a delivery of a product or service to a particular place.

7. A method as claimed in claim 1, wherein the current online transaction pertains to a request for an access to online private content.

8. A method as claimed in claim 1, wherein the current online transaction pertains to a request for an access to a private network.

9. A method as claimed in claim 1, wherein the current online transaction pertains to a request for a download of data to the communication apparatus.

10. A method as claimed in claim 1, wherein the profile information further comprises personal information regarding a party comprising at least one of: a name, a gender, a date of birth or an age, a nationality, a correspondence language, a civic address, a phone number, an email address, and an instant messaging identifier.

11. A method as claimed in claim 1, wherein the profile information further comprises a service point location associated with the logical identifier.

12. A method as claimed in claim 1, wherein the logical identifier comprises an IP address.

13. A method as claimed in claim 1, wherein the profile information further comprises location information indicative of a location of the communication apparatus.

14. A method as claimed in claim 13, wherein the location information comprises a service point location of the communication apparatus.

15. An apparatus, in an access network associated with a service provider, comprising:
    a network interface for receiving messages from a plurality of remote network nodes; and
    a processing unit coupled to said network interface and comprising a processor and a memory, said processing unit:
        storing profile information of a party registering or activating network access through a service provider, the profile information storing personal information of the party and a location of the service point of the network access;
        assigning a logical identifier to a communication apparatus connected to a port of a network element associated with the service point location, the logical identifier being used to route data associated with at least one online transaction initiated by the communication apparatus to one or more merchant servers accessible over the packet-switched network via the access network;

determining an assigned logical identifier associated with the location service point of the profile information of the user using mappings between logical identifiers associated with ports of network elements and service point locations associated with the ports of the network elements;

storing the assigned logical identifier determined to be associated with the service point location in association with the profile information with the service point location;

receiving a request message from a transaction validation server from the plurality of remote network nodes at said network interface, the request message being related to a current online transaction with one of the one or more merchant servers initiated from the communication device, and comprising a transaction-specific logical identifier of the communication device associated with the current online transaction;

in response to the request message, consulting the profile database for obtaining transaction-specific profile information associated with the transaction-specific logical identifier, the transaction-specific profile information comprising profile information stored in association with transaction-specific identifier of the current online transaction; and performing an action related to validation of the current online transaction by sending results from the consultation of the profile database, associated with the transaction-specific logical identifier, through the network interface towards the transaction validation server.

16. An apparatus as claimed in claim 15, wherein performing the action related to handling of the current online transaction comprises generating the results and transmitting a message indicative of whether the transaction-specific profile information corresponds to the profile information for the communication apparatus.

17. An apparatus as claimed in claim 15, wherein performing the action related to handling of the current online transaction comprises:

handling the current online transaction in a first manner when the transaction-specific profile information corresponds to the profile information for the communication apparatus; and handling the current online transaction in a second manner different from the first manner when the transaction-specific profile information does not correspond to the profile information for the communication apparatus.

18. An apparatus as claimed in claim 15, wherein the current online transaction pertains to a request for a delivery of a product or service to a particular place.

19. An apparatus as claimed in claim 15, wherein the current online transaction pertains to a request for an access to online private content.

20. An apparatus as claimed in claim 15, wherein the current online transaction pertains to a request for an access to a private network.

21. An apparatus as claimed in claim 15, wherein the current online transaction pertains to a request for a download of data to the communication apparatus.

22. An apparatus as claimed in claim 15, wherein the profile information further comprises personal information regarding a party comprising at least one of: a name, a gender, a date of birth or an age, a nationality, a correspondence language, a civic address, a phone number, an email address, and an instant messaging identifier.

23. An apparatus as claimed in claim 15, wherein the profile information further comprises a bandwidth available to the communication apparatus.

24. An apparatus as claimed in claim 15, wherein the logical identifier further comprises an IP address.

25. An apparatus as claimed in claim 15, wherein the profile information further comprises location information indicative of a location of the communication apparatus.

26. An apparatus as claimed in claim 25, wherein the location information comprises a service point location of the communication apparatus.

27. A system in a communications network comprising an access network, associated with a service provider, and a public packet-switched network, the system comprising:

at least one server, managed by the service provider, configured to:

store profile information of a party registering or activating network access through a service provider, the profile information storing personal information of the party and a location of the service point of the network access;

assign a logical identifier to a communication apparatus connected to a port of a network element associated with the service point, the logical identifier being used to route data associated with at least one online transaction initiated by the communication apparatus to one or more merchant servers accessible over the packet-switched network via the access network;

determine an assigned logical identifier associated with the location service point of the profile information of the user using mappings between logical identifiers associated with ports of network elements and service point locations associated with the ports of the network elements;

store the assigned logical identifier determined to be associated with the service point location in association with the profile information with the service point location;

a profile information server having access to the profile database configured to:

receive from a transaction validation server distinct from the one or more merchant servers, a request related to a current online transaction with one of the one or more merchant servers initiated from the communication device, the request message comprising a transaction-specific logical identifier of the communication device associated with the current online transaction;

in response to the request message, consult the profile database for obtaining transaction-specific profile information associated with the transaction-specific logical identifier, the transaction-specific profile information comprising profile information stored in association with transaction-specific identifier of the current online transaction; and perform an action related to validation of the current online transaction by sending results from the consultation of the profile database, associated with the transaction-specific logical identifier, to the transaction validation server.

28. A system as claimed in claim 27, wherein the at least one server is located in the access network.

29. A system as claimed in claim 27, wherein the one merchant server issues the request message received by the transaction validation server before being received therefrom by the profile information server.

30. A system as claimed in claim 27, wherein performing the action related to handling of the current online transaction comprises generating the results and transmitting a message indicative of whether the transaction-specific profile information corresponds to the profile information for the communication apparatus.

31. A system as claimed in claim 27, wherein the profile information server performs the action related to handling of the online transaction by:
- handling the current online transaction in a first manner when the transaction-specific profile information corresponds to the profile information for the communication apparatus; and
- handling the current online transaction in a second manner different from the first manner when the transaction-specific profile information does not correspond to the profile information for the communication apparatus.

* * * * *